US012478443B2

(12) United States Patent
Tojo

(10) Patent No.: US 12,478,443 B2
(45) Date of Patent: Nov. 25, 2025

(54) ROBOTIC SURGICAL SYSTEM, PATIENT-SIDE APPARATUS, AND CONTROL METHOD FOR ROBOTIC SURGICAL SYSTEM

(71) Applicants: KAWASAKI JUKOGYO KABUSHIKI KAISHA, Kobe (JP); MEDICAROID CORPORATION, Kobe (JP)

(72) Inventor: Tsuyoshi Tojo, Ibaraki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 346 days.

(21) Appl. No.: 18/264,767

(22) PCT Filed: Dec. 17, 2021

(86) PCT No.: PCT/JP2021/046775
§ 371 (c)(1),
(2) Date: Aug. 9, 2023

(87) PCT Pub. No.: WO2022/172590
PCT Pub. Date: Aug. 18, 2022

(65) Prior Publication Data

US 2024/0122664 A1 Apr. 18, 2024

(30) Foreign Application Priority Data

Feb. 12, 2021 (JP) ................................ 2021-020457

(51) Int. Cl.
*A61B 34/37* (2016.01)
*A61B 34/00* (2016.01)
(Continued)

(52) U.S. Cl.
CPC ............. *A61B 34/37* (2016.02); *A61B 34/74* (2016.02); *B25J 3/04* (2013.01); *B25J 9/1676* (2013.01);
(Continued)

(58) Field of Classification Search
CPC . A61B 2090/0818; A61B 34/37; A61B 34/74; A61B 90/03; B25J 3/04; B25J 9/0087; B25J 9/1676; B25J 9/1682; B25J 9/1689; G05B 2219/39135; G05B 2219/45117
See application file for complete search history.

(56) References Cited

U.S. PATENT DOCUMENTS 9,993,222 B2 6/2018 Azizian et al.
10,849,591 B2 12/2020 Azizian et al.
(Continued)

FOREIGN PATENT DOCUMENTS

EP 2332478 B1 8/2017
JP 2017-512078 A 5/2017
(Continued)

*Primary Examiner* — Scott Luan
(74) *Attorney, Agent, or Firm* — METROLEX IP LAW GROUP, PLLC; Robert L. Scott, Esq.

(57) ABSTRACT

A robotic surgical system includes a controller configured or programmed to perform an arm interference avoidance control to move a second manipulator arm relative to a first manipulator arm such that a reference line moves along an outer edge of an approach prohibited range of a first manipulator arm when a second manipulator arm approaches within the approach prohibited range.

20 Claims, 20 Drawing Sheets

START
RECEIVE OPERATION FOR SURGICAL INSTRUMENT AND CALCULATE SECOND ROTATION AMOUNT — S1
SET APPROACH PROHIBITED RANGE FOR ENDOSCOPE — S2
MANIPULATOR ARM ENTERING APPROACH PROHIBITED RANGE? — S3 (YES / NO)
SET FIRST REFERENCE LINE — S4
CALCULATE FIRST ROTATION AMOUNT AT WHICH FIRST REFERENCE LINE CONTACTS APPROACH PROHIBITED RANGE — S5
FIRST ROTATION AMOUNT > SECOND ROTATION AMOUNT ? — S6 (YES / NO)
PERFORM ARM INTERFERENCE AVOIDANCE CONTROL — S7
MOVE MANIPULATOR ARM TO POSTURE CORRESPONDING TO SECOND ROTATION AMOUNT — S8
END

(51) Int. Cl.

*B25J 3/04* (2006.01)
*B25J 9/16* (2006.01)
*A61B 90/00* (2016.01)

(52) U.S. Cl.

CPC ..... *B25J 9/1682* (2013.01); *A61B 2090/0818* (2016.02)

(56) References Cited

U.S. PATENT DOCUMENTS

| | | | |
|---|---|---|---|
| 2016/0345929 | A1 | 12/2016 | Azizian et al. |
| 2018/0036090 | A1 | 2/2018 | Hasegawa et al. |
| 2018/0235565 | A1 | 8/2018 | Azizian et al. |
| 2020/0298406 | A1 | 9/2020 | Griffiths |

FOREIGN PATENT DOCUMENTS

| | | | |
|---|---|---|---|
| JP | 6530759 | B2 | 6/2019 |
| WO | 2017/126101 | A1 | 7/2017 |

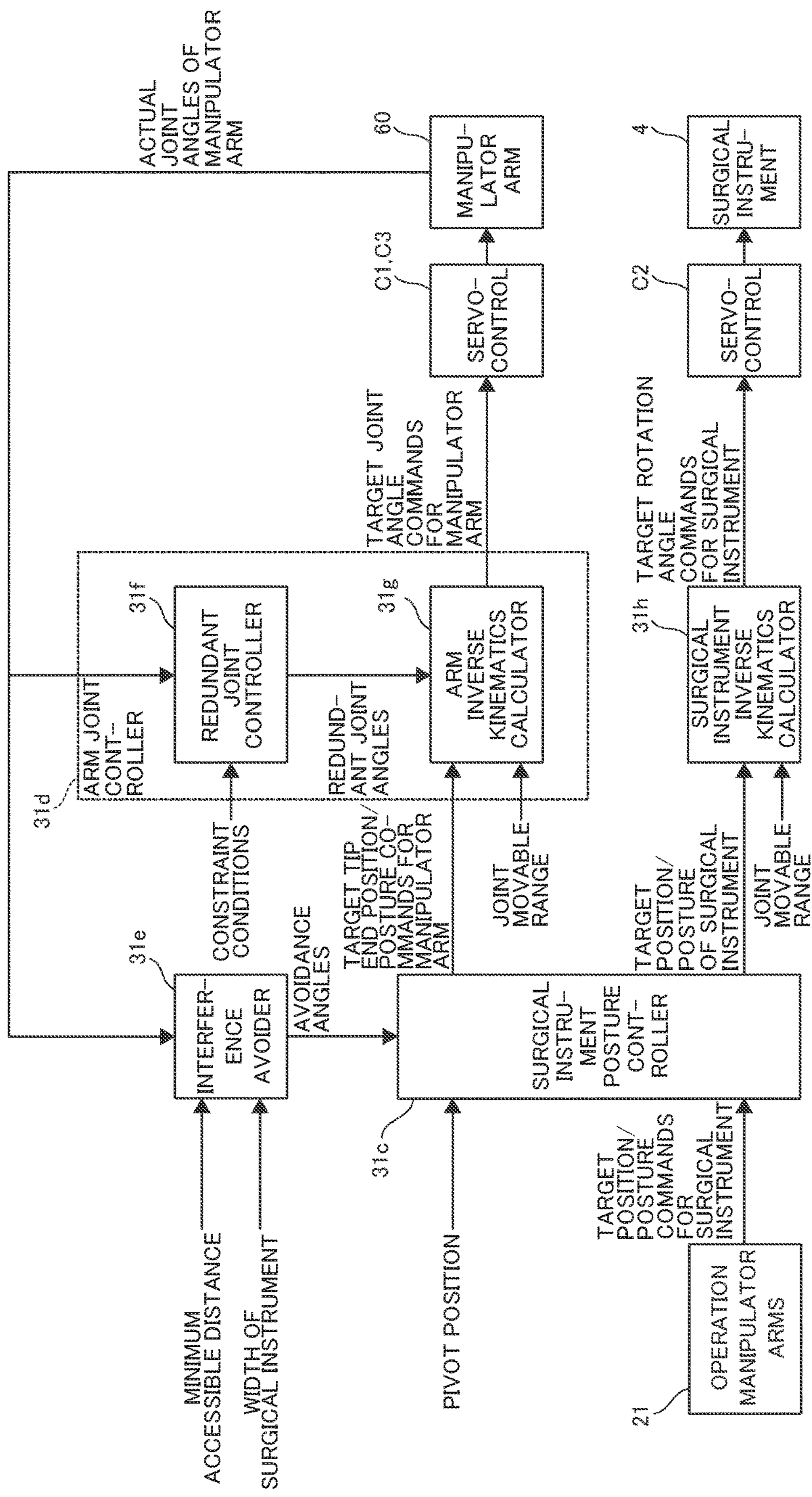
FIG. 13
MINIMUM ACCESSIBLE DISTANCE
WIDTH OF SURGICAL INSTRUMENT
PIVOT POSITION
21
OPERATION MANIPULATOR ARMS
TARGET POSITION/ POSTURE COMMANDS FOR SURGICAL INSTRUMENT
31c
SURGICAL INSTRU- MENT POSTURE CONT- ROLLER
31e
INTERFER- ENCE AVOIDER
AVOIDANCE ANGLES
CONSTRAINT CONDITIONS
TARGET TIP END POSITION/ POSTURE CO- MMANDS FOR MANIPULATOR ARM
JOINT MOVABLE RANGE
TARGET POSITION/ POSTURE OF SURGICAL INSTRUMENT
JOINT MOVABLE RANGE
31d
ARM JOINT CONT- ROLLER
31f
REDUNDANT JOINT CONTROLLER
REDUND- ANT JOINT ANGLES
31g
ARM INVERSE KINEMATICS CALCULATOR
31h
SURGICAL INSTRUMENT INVERSE KINEMATICS CALCULATOR
TARGET JOINT ANGLE COMMANDS FOR MANIPULATOR ARM
TARGET ROTATION ANGLE COMMANDS FOR SURGICAL INSTRUMENT
C1,C3
SERVO- CONTROL
C2
SERVO- CONTROL
60
MANIPU- LATOR ARM
4
SURGICAL INSTRU- MENT
ACTUAL JOINT ANGLES OF MANIPULATOR ARM

ROBOTIC SURGICAL SYSTEM, PATIENT-SIDE APPARATUS, AND CONTROL METHOD FOR ROBOTIC SURGICAL SYSTEM

TECHNICAL FIELD

The present disclosure relates to a robotic surgical system, a patient-side apparatus, and a control method for a robotic surgical system, and more particularly, it relates to a robotic surgical system, a patient-side apparatus, and a control method for a robotic surgical system that each avoid interference between manipulator arms.

BACKGROUND ART

Conventionally, a medical device that avoids interference between segments (portions of the medical device) is known. Such a medical device is disclosed in Japanese Translation of PCT International Application Publication No 2017-512078, for example.

Japanese Translation of PCT International Application Publication No 2017-512078 discloses a medical device including a plurality of movable arms and end effectors attached to the movable arms. The medical device disclosed in Japanese Translation of PCT International Application Publication No 2017-512078 avoids interference between segments (portions of the medical device). Specifically, a first virtual collision object (first VOC), which is a volume occupied by one segment, is determined. Similarly, a second virtual collision object (second VOC), which is a volume occupied by another segment, is determined. The first VOC and the second VOC each have a shape such as a spherical shape or a cylindrical shape. The first VOC and the second VOC are modeled as elastic deformable objects. Thus, one of the first VOC and the second VOC imparts a virtual displacement force (repulsive force) on the other VOC.

In Japanese Translation of PCT International Application Publication No 2017-512078, a motion plan for one segment is determined. Then, it is determined whether or not the first VOC of one segment and the second VOC of another segment overlap each other. In Japanese Translation of PCT International Application Publication No 2017-512078, when the first VOC and the second VOC overlap each other, the motion plan for one segment is adjusted such that the virtual displacement force between the first VOC and the second VOC is zero. Thus, collision (interference) between the first VOC and the second VOC is avoided.

PRIOR ART

Patent Document

Patent Document 1: Japanese Translation of PCT International Application Publication No 2017-512078

SUMMARY OF THE INVENTION

However, in Japanese Translation of PCT International Application Publication No 2017-512078, it is necessary to set the virtual collision objects (VOCs) in both one segment and another segment and calculate the virtual displacement force between the VOCs in order to avoid interference between the segments (portions of the medical device). Therefore, a control to avoid interference between the segments (portions of the medical device) becomes relatively complex.

The present disclosure is intended to solve the above problem. The present disclosure aims to provide a robotic surgical system, a patient-side apparatus, and a control method for a robotic surgical system that each avoid interference between manipulator arms while facilitating a control to avoid the interference.

In order to attain the aforementioned object, a robotic surgical system according to a first aspect of the present disclosure includes a patient-side apparatus including first and second manipulator arms each having a tip end side to which a surgical instrument is attached, an operator-side apparatus including an operation unit to receive an operation for the surgical instrument, and a controller configured or programmed to perform a control to operate the surgical instrument based on the received operation. Each of the first and second manipulator arms includes a first link to which the surgical instrument is attached and a second link connected to the first link, and the controller is configured or programmed to set an approach prohibited range in which approach to the surgical instrument attached to the first manipulator arm is prohibited, set a reference line orthogonal to a direction in which the surgical instrument extends, the reference line passing through the second link, and perform an arm interference avoidance control to move the second manipulator arm relative to the first manipulator arm such that the reference line moves along an outer edge of the approach prohibited range when the second manipulator arm approaches within the approach prohibited range of the first manipulator arm. The expression "passing through the second link" indicates a concept including the meaning of "passing through the second link" and the meaning of "contacting the second link".

In the robotic surgical system according to the first aspect of the present disclosure, as described above, the controller performs the arm interference avoidance control to move the second manipulator arm relative to the first manipulator arm such that the reference line moves along the outer edge of the approach prohibited range when the second manipulator arm approaches within the approach prohibited range of the first manipulator arm. Accordingly, when the second manipulator arm approaches within the approach prohibited range of the first manipulator arm, the reference line is moved along the outer edge of the approach prohibited range such that the second manipulator arm moves while turning around the first manipulator arm. Consequently, approach of the second manipulator arm to the first manipulator arm is reduced or prevented, and thus interference between the manipulator arms can be avoided. Furthermore, interference between the manipulator arms can be avoided only by moving the reference line set for the second manipulator arm along the outer edge of the approach prohibited range of the first manipulator arm, and thus a control to avoid interference can be facilitated as compared with a case in which approach prohibited ranges are set for both the first and second manipulator arms, and a virtual displacement force between the approach prohibited ranges is calculated. Consequently, interference between the manipulator arms can be avoided while a control to avoid the interference is facilitated.

A robotic surgical system according to a second aspect of the present disclosure includes a patient-side apparatus including first and second manipulator arms each having a tip end side to which a surgical instrument is attached, an operator-side apparatus including an operation unit to receive an operation for the surgical instrument, and a controller configured or programmed to perform a control to operate the surgical instrument based on the received operation. Each of the first and second manipulator arms includes a first link to which the surgical instrument is attached and a second link connected to the first link, the controller is configured or programmed to set an approach prohibited range in which approach to the surgical instrument attached to the first manipulator arm is prohibited, set a reference line orthogonal to a direction in which the surgical instrument extends, the reference line passing through the second link, and perform an arm interference avoidance control to move the second manipulator arm relative to the first manipulator arm such that a plane including the reference line and a direction in which the surgical instrument extends moves along an outer edge of the approach prohibited range when the second manipulator arm approaches within the approach prohibited range of the first manipulator arm, and the plane is a plane on a base end side of the surgical instrument with respect to the reference line in the direction in which the surgical instrument extends. The term "base end side" refers to the side opposite to the tip end side of the surgical instrument.

In the robotic surgical system according to the second aspect of the present disclosure, as described above, the controller performs the arm interference avoidance control to move the second manipulator arm relative to the first manipulator arm such that the plane including the reference line and the direction in which the surgical instrument extends moves along the outer edge of the approach prohibited range when the second manipulator arm approaches within the approach prohibited range of the first manipulator arm, and the plane is the plane on the base end side of the surgical instrument with respect to the reference line in the direction in which the surgical instrument extends. Accordingly, when the second manipulator arm approaches within the approach prohibited range of the first manipulator arm, the plane is moved along the outer edge of the approach prohibited range such that the second manipulator arm moves while turning around the first manipulator arm. Consequently, approach of the second manipulator arm to the first manipulator arm is reduced or prevented, and thus interference between the manipulator arms can be avoided. Furthermore, interference between the manipulator arms can be avoided only by moving the plane set for the second manipulator arm along the outer edge of the approach prohibited range of the first manipulator arm, and thus a control to avoid the interference can be facilitated as compared with a case in which approach prohibited ranges are set for both the first and second manipulator arms, and a virtual displacement force between the approach prohibited ranges is calculated. Consequently, interference between the manipulator arms can be avoided while a control to avoid the interference is facilitated.

A patient-side apparatus according to a third aspect of the present disclosure includes first and second manipulator arms each having a tip end side to which a surgical instrument is attached, and a controller configured or programmed to perform a control to operate the surgical instrument based on an operation for the surgical instrument received by an operation unit operable to receive the operation. Each of the first and second manipulator arms includes a first link to which the surgical instrument is attached and a second link connected to the first link, and the controller is configured or programmed to set an approach prohibited range in which approach to the surgical instrument attached to the first manipulator arm is prohibited, set a reference line orthogonal to a direction in which the surgical instrument extends, the reference line passing through the second link, and perform an arm interference avoidance control to move the second manipulator arm relative to the first manipulator arm such that the reference line moves along an outer edge of the approach prohibited range when the second manipulator arm approaches within the approach prohibited range of the first manipulator arm.

In the patient-side apparatus according to the third aspect of the present disclosure, as described above, the controller performs the arm interference avoidance control to move the second manipulator arm relative to the first manipulator arm such that the reference line moves along an outer edge of the approach prohibited range when the second manipulator arm approaches within the approach prohibited range of the first manipulator arm. Accordingly, when the second manipulator arm approaches within the approach prohibited range of the first manipulator arm, the reference line is moved along the outer edge of the approach prohibited range such that the second manipulator arm moves while turning around the first manipulator arm. Consequently, approach of the second manipulator arm to the first manipulator arm is reduced or prevented, and thus interference between the manipulator arms can be avoided. Furthermore, interference between the manipulator arms can be avoided only by moving the reference line set for the second manipulator arm along the outer edge of the approach prohibited range of the first manipulator arm, and thus a control to avoid the interference can be facilitated as compared with a case in which approach prohibited ranges are set for both the first and second manipulator arms, and a virtual displacement force between the approach prohibited ranges is calculated. Consequently, it is possible to provide the patient-side apparatus capable of avoiding interference between the manipulator arms while facilitating a control to avoid the interference.

A control method for a robotic surgical system according to a fourth aspect of the present disclosure includes receiving an operation for a surgical instrument attached to a tip end side of each of first and second manipulator arms, and performing a control to operate the surgical instrument based on the received operation. The performing the control to operate the surgical instrument includes setting an approach prohibited range in which approach to the surgical instrument attached to the first manipulator arm is prohibited, setting a reference line orthogonal to a direction in which the surgical instrument extends, the reference line passing through a second link connected to a first link of each of the manipulator arms to which the surgical instrument is attached, and performing an arm interference avoidance control to move the second manipulator arm relative to the first manipulator arm such that the reference line moves along an outer edge of the approach prohibited range when the second manipulator arm approaches within the approach prohibited range of the first manipulator arm.

As described above, the control method for the robotic surgical system according to the fourth aspect of the present disclosure includes performing the arm interference avoidance control to move the second manipulator arm relative to the first manipulator arm such that the reference line moves along the outer edge of the approach prohibited range when the second manipulator arm approaches within the approach prohibited range of the first manipulator arm. Accordingly, when the second manipulator arm approaches within the approach prohibited range of the first manipulator arm, the reference line is moved along the outer edge of the approach prohibited range such that the second manipulator arm moves while turning around the first manipulator arm. Consequently, approach of the second manipulator arm to the first manipulator arm is reduced or prevented, and thus interference between the manipulator arms can be avoided.

Furthermore, interference between the manipulator arms can be avoided only by moving the reference line set for the second manipulator arm along the outer edge of the approach prohibited range of the first manipulator arm, and thus a control to avoid interference can be facilitated as compared with a case in which approach prohibited ranges are set for both the first and second manipulator arms, and a virtual displacement force between the approach prohibited ranges is calculated. Consequently, it is possible to provide the control method for the robotic surgical system capable of avoiding interference between the manipulator arms while facilitating a control to avoid the interference.

According to the present disclosure, as described above, it is possible to avoid interference between the manipulator arms while facilitating a control to avoid the interference.

BRIEF DESCRIPTION OF THE DRAWINGS

FIG. 13 is a block diagram (2) showing the configuration of the controller of the medical manipulator according to the first embodiment of the present disclosure.

MODES FOR CARRYING OUT THE INVENTION

Figure 1:
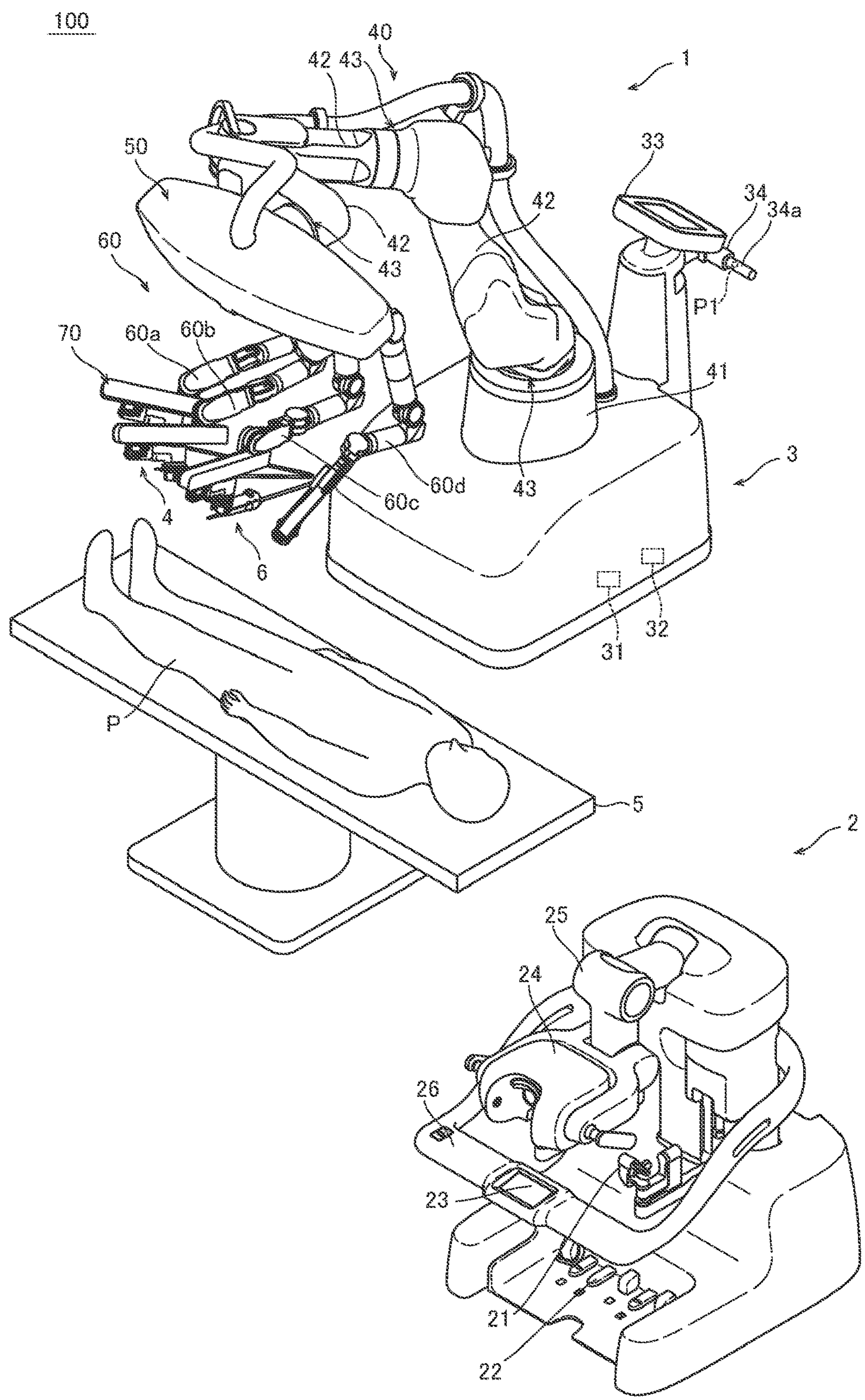
FIG. 1 is a diagram showing the configuration of a surgical system according to a first embodiment of the present disclosure.

Embodiments embodying the present disclosure are hereinafter described on the basis of the drawings.

First Embodiment

The configuration of a surgical system 100 according to a first embodiment is now described with reference to FIGS. 1 to 17. The surgical system 100 includes a medical manipulator 1 that is a patient P-side apparatus and a remote control apparatus 2 that is an operator-side apparatus to operate the medical manipulator 1. The medical manipulator 1 includes a medical cart 3, and is movable. The remote control apparatus 2 is spaced apart from the medical manipulator 1, and the medical manipulator 1 is remotely operated by the remote control apparatus 2. A surgeon inputs a command to the remote control apparatus 2 to cause the medical manipulator 1 to perform a desired operation. The remote control apparatus 2 transmits the input command to the medical manipulator 1. The medical manipulator 1 operates based on the received command. The medical manipulator 1 is arranged in an operating room that is a sterilized sterile field. The surgical system 100 is an example of a robotic surgical system.

The remote control apparatus 2 is arranged inside or outside the operating room, for example. The remote control apparatus 2 includes operation manipulator arms 21, operation pedals 22, a touch panel 23, a monitor 24, a support arm 25, and a support bar 26. The operation manipulator arms 21 include operation handles for the surgeon to input commands. The operation manipulator arms 21 receive the amount of operation for a surgical instrument 4. The monitor 24 is a scope-type display that displays an image captured by an endoscope 6. The support arm 25 supports the monitor 24 so as to align the height of the monitor 24 with the height of the surgeon's face. The touch panel 23 is arranged on the support bar 26. The surgeon's head is detected by a sensor (not shown) provided in the vicinity of the monitor 24 such that the medical manipulator 1 can be operated by the remote control apparatus 2. The surgeon operates the operation manipulator arms 21 and the operation pedals 22 while visually recognizing an affected area on the monitor 24. Thus, a command is input to the remote control apparatus 2. The command input to the remote control apparatus 2 is transmitted to the medical manipulator 1. The operation manipulator arms 21 are examples of an operation unit.

The medical cart 3 includes a controller 31 that controls the operation of the medical manipulator 1 and a storage 32 that stores programs or the like to control the operation of the medical manipulator 1. The controller 31 of the medical cart 3 controls the operation of the medical manipulator 1 based on the command input to the remote control apparatus 2.

The medical cart 3 includes an input 33. The input 33 receives operations to move a positioner 40, an arm base 50, and a plurality of manipulator arms 60 or change their postures mainly in order to prepare for surgery before the surgery.

Figure 2:
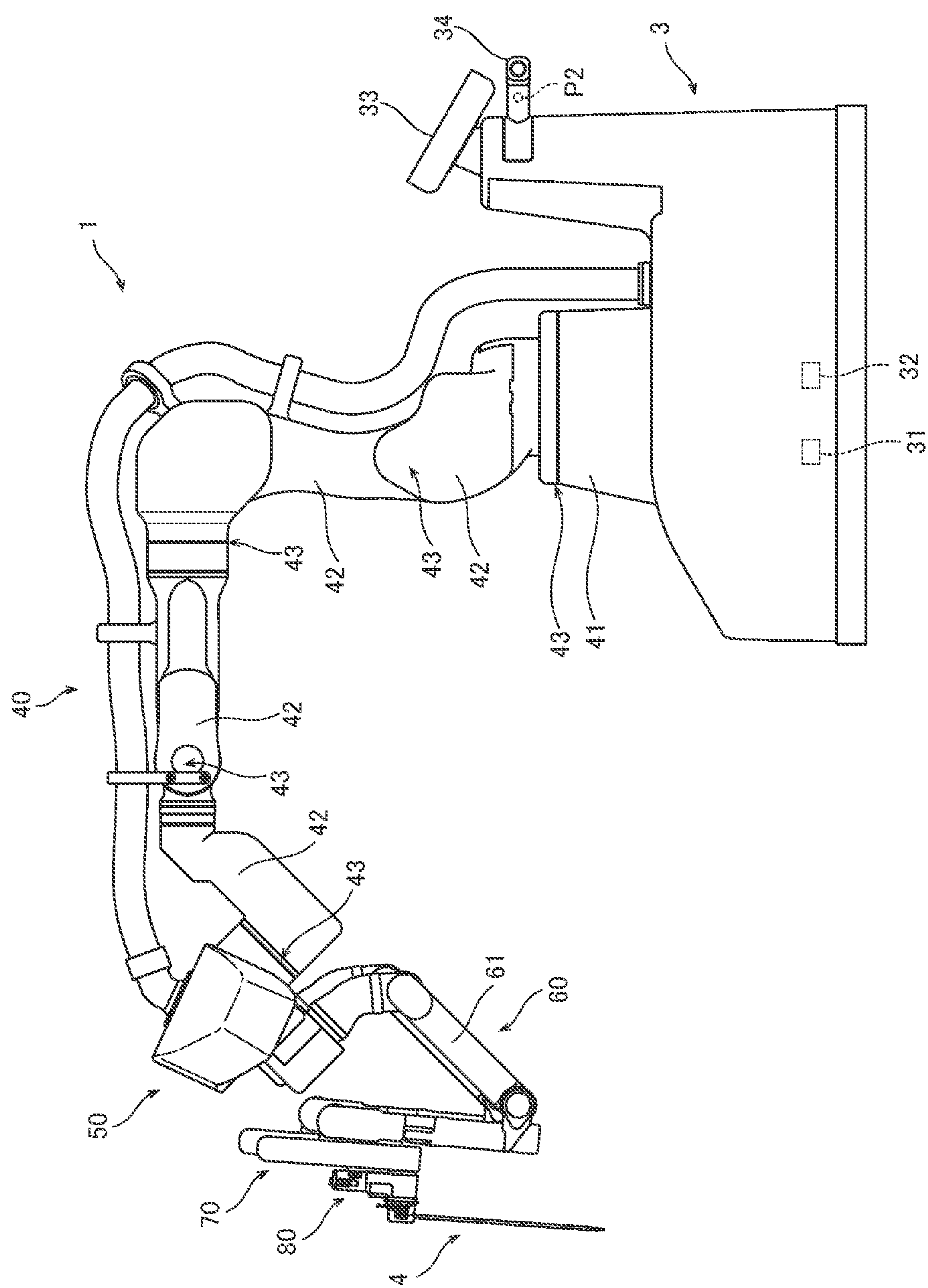
FIG. 2 is a diagram showing the configuration of a medical manipulator according to the first embodiment of the present disclosure.

The medical manipulator 1 shown in FIGS. 1 and 2 is arranged in the operating room. The medical manipulator 1 includes the medical cart 3, the positioner 40, the arm base 50, and the plurality of manipulator arms 60. The arm base 50 is attached to the tip end of the positioner 40. The arm base 50 has a relatively long rod shape (long shape). The bases of the plurality of manipulator arms 60 are attached to the arm base 50. Each of the plurality of manipulator arms 60 is able to take a folded posture (stored posture). The arm base 50 and the plurality of manipulator arms 60 are covered with sterile drapes (not shown) and used.

The positioner 40 includes a 7-axis articulated robot, for example. The positioner 40 is arranged on the medical cart 3. The positioner 40 moves the arm base 50. Specifically, the positioner 40 moves the position of the arm base 50 three-dimensionally.

The positioner 40 includes a base 41 and a plurality of links 42 coupled to the base 41. The plurality of links 42 are coupled to each other by joints 43.

As shown in FIG. 1, the surgical instrument 4 is attached to the tip end of each of the plurality of manipulator arms 60. The surgical instrument 4 includes a replaceable instrument or the endoscope 6 (see FIG. 6), for example.

Figure 3:
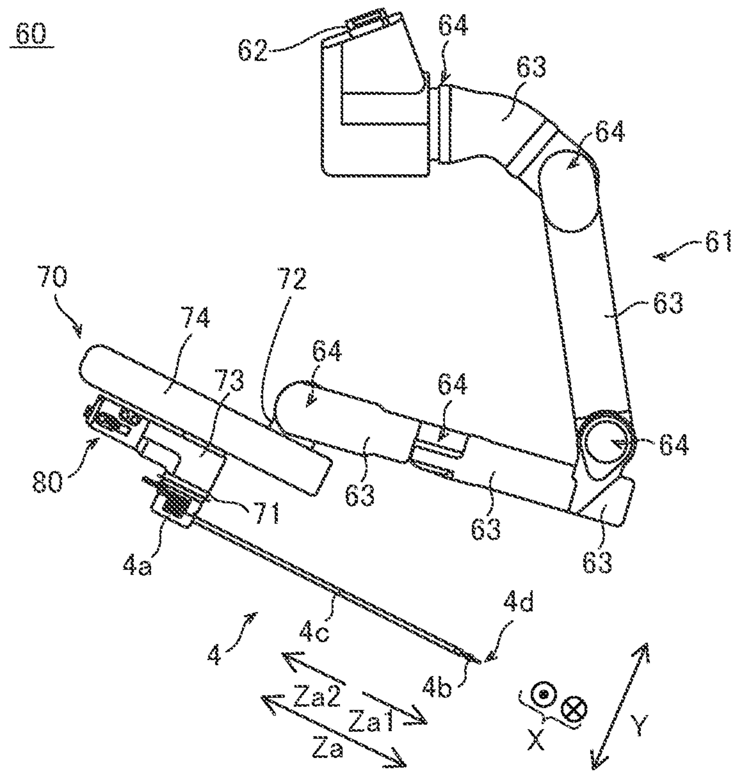
FIG. 3 is a diagram showing the configuration of a manipulator arm of the medical manipulator according to the first embodiment of the present disclosure.

As shown in FIG. 3, the instrument includes a driven unit 4*a* driven by servomotors M2 provided in a holder 71 of each of the manipulator arms 60. A pair of forceps 4*b* is provided as an end effector at the tip end of the instrument. The pair of forceps 4*b* includes two end effector members 4*b*' and 4*b*".

Figure 4:
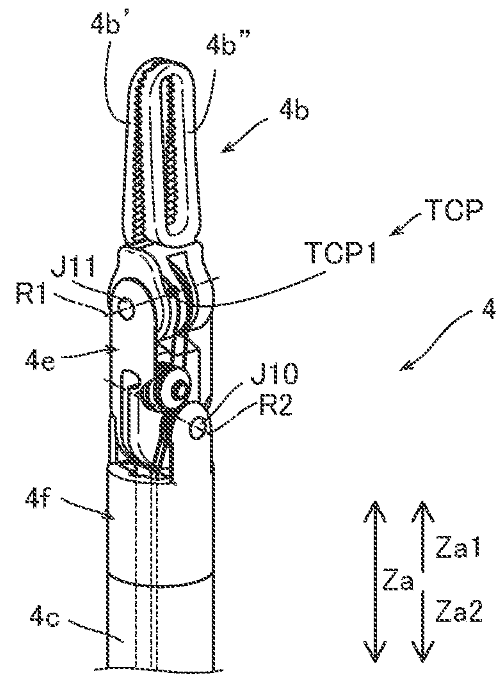
FIG. 4 is a diagram showing a pair of forceps.

As shown in FIG. 4, the instrument includes a first support 4*e* that supports the base end sides of the end effector members 4*b*' and 4*b*" on the tip end side such that the base end sides of the end effector members 4*b*' and 4*b*" are rotatable about a J11 axis, a second support 4*f* that supports the base end side of the first support 4*e* on the tip end side such that the base end side of the first support 4*e* is rotatable about a J10 axis, and a shaft 4*c* connected to the base end side of the second support 4*f*. The driven unit 4*a*, the shaft 4*c*, the second support 4*f*, the first support 4*e*, and the pair of forceps 4*b* are arranged along a Za direction. The J11 axis is orthogonal (z11 direction; see FIG. 12) to a direction (Za direction) in which the shaft 4*c* extends. The J10 axis is spaced apart from the J11 axis in the direction in which the shaft 4*c* extends, and is orthogonal to the direction in which the shaft 4*c* extends and the J11 axis.

The pair of forceps 4*b* is attached to the first support 4*e* so as to rotate about the rotation axis line R1 of the J11 axis. The second support 4*f* supports the first support 4*e* such that the first support 4*e* is rotatable about the J10 axis. That is, the first support 4*e* is attached to the second support 4*f* so as to rotate about the rotation axis line R2 of the J10 axis. A portion of the first support 4*e* on the tip end side (Za1 direction side) has a U-shape. A tool center point (TCP1) is set at the center of the tip end of the U-shaped portion of the first support 4*e* in a rotation axis line R1 direction.

Figure 6:
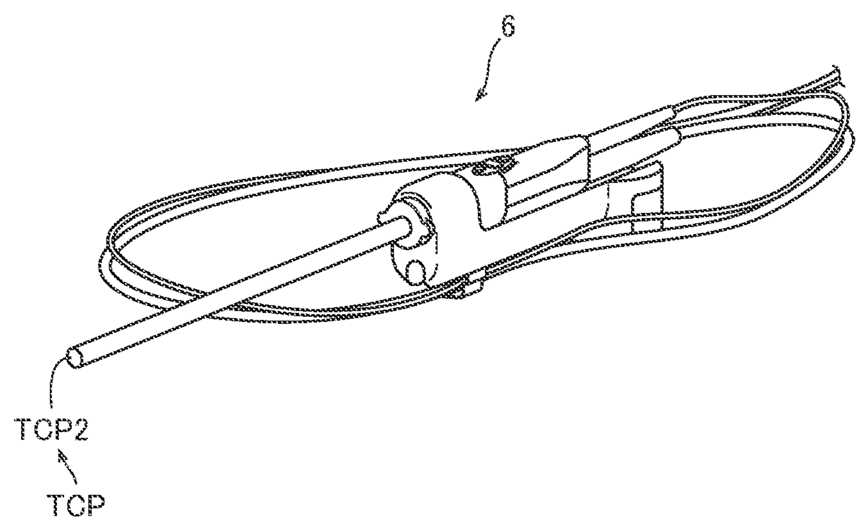
FIG. 6 is a diagram showing an endoscope.
Figure 7:
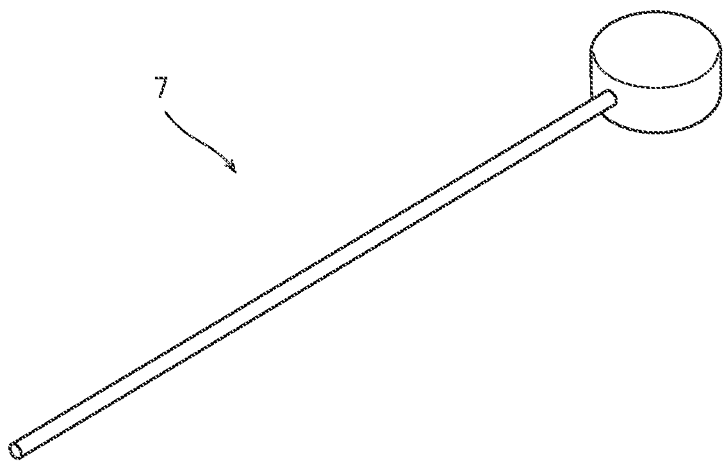
FIG. 7 is a diagram showing a pivot position teaching instrument.

As shown in FIG. 6, a TCP2 of the endoscope 6 is set at the tip end of the endoscope 6.

The configuration of the manipulator arms 60 is now described in detail.

As shown in FIG. 3, each of the manipulator arms 60 includes an arm portion 61 (a base 62, links 63, and joints 64) and a translation mechanism 70 provided at the tip end of the arm portion 61. The tip end sides of the manipulator arms 60 three-dimensionally move with respect to the base sides (arm base 50) of the manipulator arms 60. The plurality of manipulator arms 60 have the same or similar configuration as each other.

The translation mechanism 70 is provided on the tip end side of the arm portion 61, and the surgical instrument 4 is attached thereto. The translation mechanism 70 translates the surgical instrument 4 in a direction in which the surgical instrument 4 is inserted into a patient P. Furthermore, the translation mechanism 70 translates the surgical instrument 4 relative to the arm portion 61. Specifically, the translation mechanism 70 includes the holder 71 that holds the surgical instrument 4. The servomotors M2 (see FIG. 10) are housed in the holder 71. The servomotors M2 rotate rotary bodies provided in the driven unit 4*a* of the surgical instrument 4. The rotary bodies in the driven unit 4*a* are rotated such that the pair of forceps 4*b* is operated.

The arm portion 61 includes a 7-axis articulated robot arm. The arm portion 61 includes the base 62 to attach the arm portion 61 to the arm base 50, and a plurality of links 63 coupled to the base 62. The plurality of links 63 are coupled to each other by the joints 64.

The translation mechanism 70 translates the surgical instrument 4 attached to the holder 71 along the Za direction (the direction in which the shaft 4*c* extends) by translating the holder 71 along the Za direction. Specifically, the translation mechanism 70 includes a base end side link 72 connected to the tip end of the arm portion 61, a tip end side link 73, and a coupling link 74 provided between the base end side link 72 and the tip end side link 73. The holder 71 is provided on the tip end side link 73. The tip end side link 73 and the coupling link 74 are examples of a first link and a second link, respectively.

The coupling link 74 of the translation mechanism 70 is configured as a double speed mechanism that moves the tip end side link 73 relative to the base end side link 72 along the Za direction. The tip end side link 73 is moved along the Za direction relative to the base end side link 72 such that the surgical instrument 4 provided on the holder 71 is translated along the Za direction. The tip end of the arm portion 61 is connected to the base end side link 72 so as to rotate the base end side link 72 about an X direction orthogonal to the Za direction.

Figure 5:
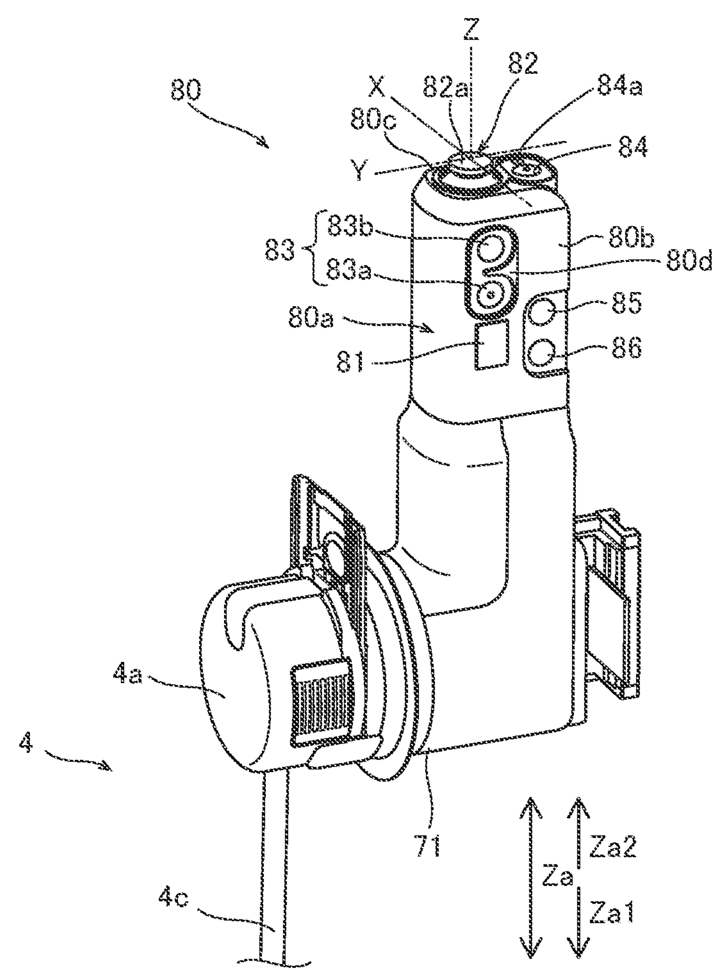
FIG. 5 is a perspective view showing the configuration of an arm operation unit of the medical manipulator according to the first embodiment of the present disclosure.

As shown in FIG. 5, the medical manipulator 1 includes an arm operation unit 80 attached to each of the manipulator arms 60 to operate the manipulator arm 60. The arm operation unit 80 includes enable switches 81, a joystick 82, and switch units 83. The enable switches 81 enable or disable movement of the manipulator arm 60 in response to the joystick 82 and the switch units 83. The enable switches 81 enable movement of the surgical instrument 4 by the manipulator arm 60 when the enable switches 81 are pressed by an operator (such as a nurse or an assistant) grasping the arm operation unit 80. A pair of enable switches 81 are provided on opposite sides of the outer peripheral surface 80*a* of the arm operation unit 80.

Each of the switch units 83 includes a switch 83*a* to move the surgical instrument 4 in the direction in which the surgical instrument 4 is inserted into the patient P along the longitudinal direction of the surgical instrument 4, and a switch 83*b* to move the surgical instrument 4 in a direction opposite to the direction in which the surgical instrument 4 is inserted into the patient P. Both the switch 83*a* and the switch 83*b* are push-button switches. The switch units 83 are provided on the opposite sides of the outer peripheral surface 80*a* of the arm operation unit 80. Specifically, each (a pair of switches 83*a* and 83*b*) of the switch units 83 is provided on each of opposite side surfaces of the arm operation unit 80.

As shown in FIG. 5, the arm operation unit 80 includes pivot buttons 85 to teach a pivot position PP that serves as a fulcrum (see FIG. 9) for movement of the surgical instrument 4 attached to the manipulator arm 60. The pivot buttons 85 are provided adjacent to the enable switches 81 on surfaces 80*b* of the arm operation unit 80. The pivot buttons 85 are pressed while the tip end of the endoscope 6 (see FIG. 6) or the tip end of a pivot position teaching member 7 (FIG. 7) is moved to a position corresponding to the insertion position of a trocar T inserted into the body surface S of the patient P such that the pivot position PP is taught and stored in the storage 32. In the teaching of the pivot position PP, the pivot position PP is set as one point (coordinates), and the direction of the surgical instrument 4 is not set. A pair of pivot buttons 85 are provided on the opposite sides of the outer peripheral surface 80*a* of the arm operation unit 80.

As shown in FIG. 1, the endoscope 6 is attached to one manipulator arm 60 (manipulator arm 60*c*, for example) of the plurality of manipulator arms 60, and surgical instruments 4 other than the endoscope 6 are attached to the remaining manipulator arms 60 (manipulator arms 60*a*, 60*b*, and 60*d*, for example). Specifically, in surgery, the endoscope 6 is attached to one of four manipulator arms 60, and the surgical instruments 4 (such as pairs of forceps) other than the endoscope 6 are attached to the three manipulator arms 60. A pivot position PP1 is taught with the endoscope 6 attached to the manipulator arm 60 to which the endoscope 6 is to be attached. Furthermore, a pivot position PP2 is taught with the pivot position teaching member 7 attached to the manipulator arm 60 to which the surgical instrument 4 other than the endoscope 6 is to be attached. The endoscope 6 is attached to one of two manipulator arms 60 (manipulator arms 60*b* and 60*c*) arranged in the center among the four manipulator arms 60 arranged adjacent to each other. That is, the pivot position PP is individually set for each of the plurality of manipulator arms 60. The manipulator arm 60*b* is an example of a second manipulator arm. The manipulator arm 60*c* is an example of a first manipulator arm.

As shown in FIG. 5, adjustment buttons 86 are provided on the surfaces 80*b* of the arm operation unit 80 to optimize the position of the manipulator arm 60. After the pivot position PP for the manipulator arm 60 to which the endoscope 6 has been attached is taught, the adjustment buttons 86 are pressed such that the positions of the other manipulator arms 60 (arm base 50) are optimized. A pair of adjustment buttons 86 are provided on the opposite sides of the outer peripheral surface 80*a* of the arm operation unit 80.

As shown in FIG. 5, the arm operation unit 80 includes a mode switching button 84 to switch between a mode for translating (see FIG. 8) the surgical instrument 4 (or the endoscope 6) attached to the arm manipulator 60 and a mode for rotationally moving (see FIG. 9) the surgical instrument 4 (or the endoscope 6). Furthermore, a mode indicator 84*a* is provided in the vicinity of the mode switching button 84. The mode indicator 84*a* indicates a switched mode. Specifically, the mode indicator 84*a* is turned on (rotational movement mode) or off (translational mode) such that the current mode (translational mode or rotational movement mode) is indicated.

The mode indicator 84*a* also serves as a pivot position indicator that indicates that the pivot position PP has been taught.

Figure 8:
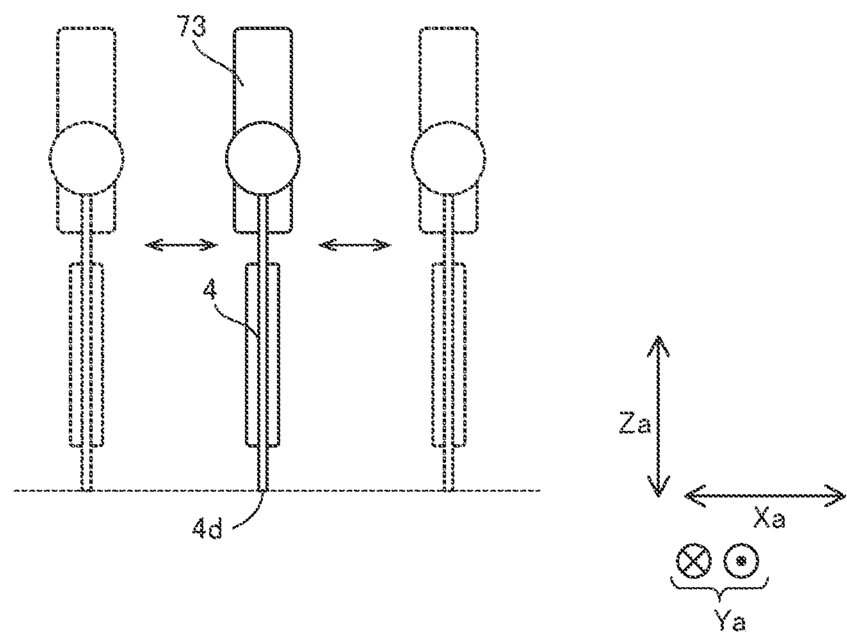
FIG. 8 is a diagram for illustrating translation of the manipulator arm.
Figure 9:
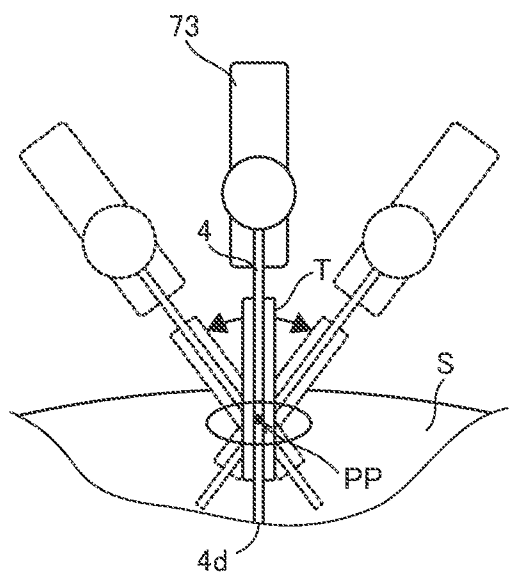
FIG. 9 is a diagram for illustrating rotation of the manipulator arm.

As shown in FIG. 8, in the mode for translating the manipulator arm 60, the manipulator arm 60 is moved such that the tip end 4*d* of the surgical instrument 4 moves on an X-Y plane. As shown in FIG. 9, in the mode for rotationally moving the manipulator arm 60, when the pivot position PP is not taught, the manipulator arm 60 is moved such that the surgical instrument 4 rotationally moves about the pair of forceps 4*b*, and when the pivot position PP is taught, the manipulator arm 60 is moved such that the surgical instrument 4 rotationally moves about the pivot position PP as a fulcrum. The surgical instrument 4 is rotationally moved while the shaft 4*c* of the surgical instrument 4 is inserted into the trocar T.

Figure 10:
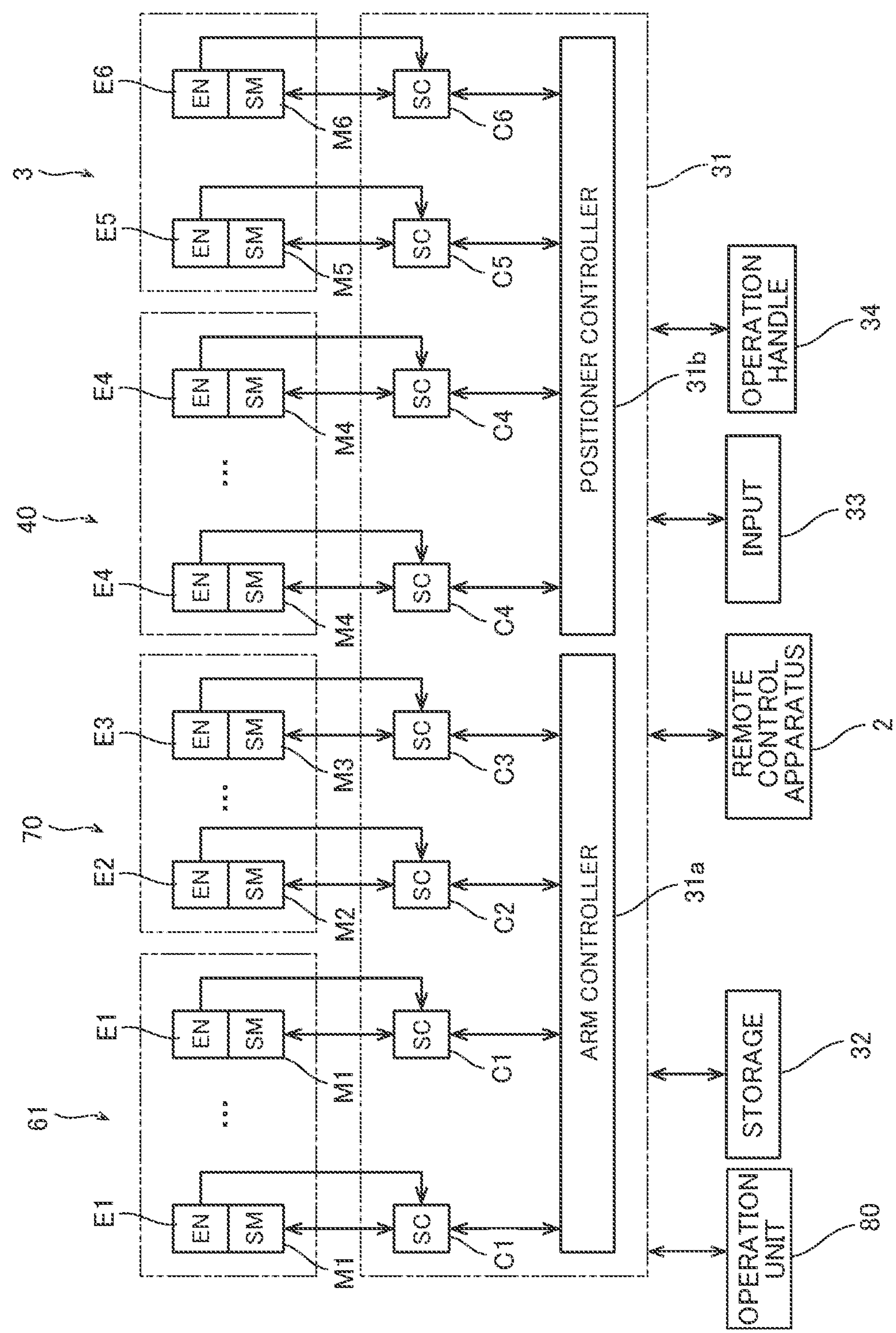
FIG. 10 is a block diagram (1) showing the configuration of a controller of the medical manipulator according to the first embodiment of the present disclosure.

As shown in FIG. 10, the manipulator arm 60 includes a plurality of servomotors M1, encoders E1, and speed reducers (not shown) so as to correspond to a plurality of joints 64 of the arm portion 61. The encoders E1 detect the rotation angles of the servomotors M1. The speed reducers slow down rotation of the servomotors M1 to increase the torques.

As shown in FIG. 10, the translation mechanism 70 includes the servomotors M2 to rotate the rotary bodies provided in the driven unit 4*a* of the surgical instrument 4, a servomotor M3 to translate the surgical instrument 4, encoders E2, an encoder E3, and speed reducers (not shown). The encoders E2 and E3 detect the rotation angles of the servomotors M2 and M3, respectively. The speed reducers slow down rotation of the servomotors M2 and M3 to increase the torques.

The positioner 40 includes a plurality of servomotors M4, encoders E4, and speed reducers (not shown) so as to correspond to a plurality of joints 43 of the positioner 40. The encoders E4 detect the rotation angles of the servomotors M4. The speed reducers slow down rotation of the servomotors M4 to increase the torques.

The medical cart 3 includes servomotors M5 to drive a plurality of front wheels (not shown) of the medical cart 3, respectively, encoders E5, and speed reducers (not shown). The encoders E5 detect the rotation angles of the servomotors M5. The speed reducers slow down rotation of the servomotors M5 to increase the torques.

The medical cart 3 includes the servomotors M5 to drive the plurality of front wheels (not shown) of the medical cart 3, respectively, the encoders E5, the speed reducers (not shown), and brakes (not shown). The speed reducers slow down rotation of the servomotors M5 to increase the torques. A potentiometer P1 (see FIG. 1) is provided on a throttle 34*a* of the medical cart 3, and the servomotors M5 of the front wheels are driven based on a rotation angle detected by the potentiometer P1 according to the twist of the throttle 34*a*. Rear wheels (not shown) of the medical cart 3 are of the dual wheel type, and the rear wheels are steered based on rightward-leftward (R direction) rotation of an operation handle 34. Furthermore, a potentiometer P2 (see FIG. 2) is provided on the operation handle 34 of the medical cart 3, and servomotors M6, encoders E6, and speed reducers (not shown) are provided on the rear wheels of the medical cart 3. The speed reducers slow down rotation of the servomotors M6 to increase the torques. The servomotors M6 are driven based on a rotation angle detected by the potentiometer P2 according to rightward-leftward (R direction) rotation of the operation handle 34. That is, steering of the rear wheels by the rightward-leftward (R direction) rotation of the operation handle 34 is power-assisted by the servomotors M6. The servomotors M5 and the servomotors M6 are examples of a medical cart drive.

The front wheels of the medical cart 3 are driven such that the medical cart 3 moves in a forward-rearward direction. Furthermore, the operation handle 34 of the medical cart 3 is rotated such that the rear wheels are steered, and the medical cart 3 turns in a rightward-leftward direction.

The controller 31 of the medical cart 3 includes an arm controller 31*a* to control movement of the plurality of manipulator arms 60 based on commands, and a positioner controller 31*b* to control movement of the positioner 40 and driving of the front wheels and rear wheels (not shown) of the medical cart 3 based on commands. Servo controllers C1 that control the servomotors M1 to drive the manipulator arm 60 are electrically connected to the arm controller 31*a*. The encoders E1 that detect the rotation angles of the servomotors M1 are electrically connected to the servo controllers C1.

Servo controllers C2 that control the servomotors M2 to drive the surgical instrument 4 are electrically connected to the arm controller 31*a*. The encoders E2 that detect the rotation angles of the servomotors M2 are electrically connected to the servo controllers C2. A servo controller C3 that controls the servomotor M3 to translate the translation mechanism 70 is electrically connected to the arm controller 31*a*. The encoder E3 that detects the rotation angle of the servomotor M3 is electrically connected to the servo controller C3.

An operation command input to the remote control apparatus 2 is input to the arm controller 31*a*. The arm controller 31*a* generates position commands based on the input operation command and the rotation angles detected by the encoders E1 (E2, E3), and outputs the position commands to the servo controllers C1 (C2, C3). The servo controllers C1 (C2, C3) generate torque commands based on the position commands input from the arm controller 31*a* and the rotation angles detected by the encoders E1 (E2, E3), and output the torque commands to the servomotors M1 (M2, M3). Thus, the manipulator arm 60 is moved according to the operation command input to the remote control apparatus 2.

The arm controller 31*a* operates the manipulator arm 60 based on an input signal from the joystick 82 of the arm operation unit 80. Specifically, the arm controller 31*a* generates position commands based on the input signal (operation command) input from the joystick 82 and the rotation angles detected by the encoders E1, and outputs the position commands to the servo controllers C1. The servo controllers C1 generate torque commands based on the position commands input from the arm controller 31*a* and the rotation angles detected by the encoders E1, and output the torque commands to the servomotors M1. Thus, the manipulator arm 60 is moved according to the operation command input to the joystick 82.

The arm controller 31*a* operates the manipulator arm 60 based on an input signal from each of the switch units 83 of the arm operation unit 80. Specifically, the arm controller 31*a* generates a position command based on the input signal (operation command) input from each of the switch units 83 and the rotation angle detected by the encoders E1 or the encoder E3, and outputs the position command to the servo controllers C1 or the servo controller C3. The servo controllers C1 or the servo controller C3 generates a torque command based on the position command input from the arm controller 31*a* and the rotation angle detected by the encoders E1 or the encoder E3, and outputs the torque command to the servomotors M1 or the servomotor M3. Thus, the manipulator arm 60 is moved according to the operation command input to each of the switch units 83.

As shown in FIG. 10, servo controllers C4 that control the servomotors M4 to move the positioner 40 are electrically connected to the positioner controller 31*b*. The encoders E4 that detect the rotation angles of the servomotors M4 are electrically connected to the servo controllers C4. Servo controllers C5 that control the servomotors M5 to drive the front wheels (not shown) of the medical cart 3 are electrically connected to the positioner controller 31*b*. The encoders E5 that detect the rotation angles of the servomotors M5 are electrically connected to the servo controllers C5. Servo controllers C6 that control the servomotors M6 to drive the rear wheels (not shown) of the medical cart 3 are electrically connected to the positioner controller 31*b*. The encoders E6 that detect the rotation angles of the servomotors M6 are electrically connected to the servo controllers C6.

An operation command is input from the input 33 to the positioner controller 31*b*. The positioner controller 31*b* generates position commands based on the operation command input from the input 33 and the rotation angles detected by the encoders E4, and outputs the position commands to the servo controllers C4. The servo controllers C4 generate torque commands based on the position commands input from the positioner controller 31*b* and the rotation angles detected by the encoders E4, and output the torque commands to the servomotors M4. Thus, the positioner 40 is moved according to the operation command input to the input 33. Although detailed description is omitted, the positioner controller 31*b* moves the medical cart 3 based on an operation command from the operation handle 34 by a similar procedure.

Axes of Manipulator Arm

Axes of the manipulator arm 60 are now described with reference to FIG. 11.

Figure 11:
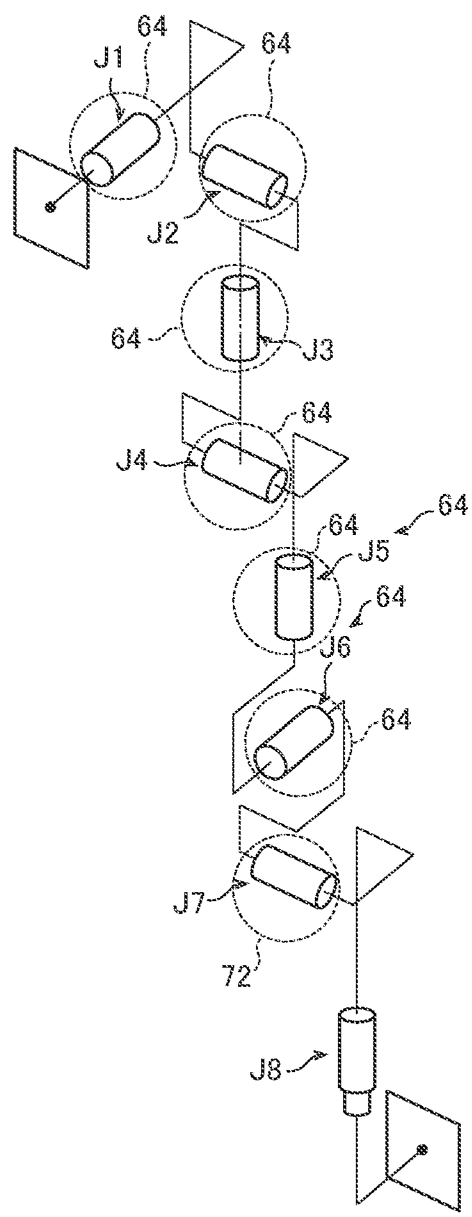
FIG. 11 is a diagram showing rotation axes (a linear motion axis) of the manipulator arm.

In the first embodiment, as shown in FIG. 11, the manipulator arm 60 includes seven or more joint axes (eight axes in the first embodiment). Specifically, the manipulator arm 60 includes J1 to J7 axes as rotation axes and a J8 axis as a linear motion axis. The J1 to J7 axes correspond to the rotation axes of the joints 64 of the arm portion 61. The J7 axis also corresponds to the base end side link 72 of the translation mechanism 70 (see FIG. 3). The J8 axis corresponds to an axis for moving the tip end side link 73 of the translation mechanism 70 relative to the base end side link 72 along the Za direction. That is, the servomotors M1 shown in FIG. 10 are provided so as to correspond to the J1 to J7 axes of the manipulator arm 60. The servomotor M3 is provided so as to correspond to the J8 axis. The J1 axis and the J7 axis are examples of a base end axis and a rotation axis, respectively.

Axes of Surgical Instrument (Pair of Forceps)

Axes of the surgical instrument 4 (pair of forceps 4*b*) are now described with reference to FIG. 12.

Figure 12:
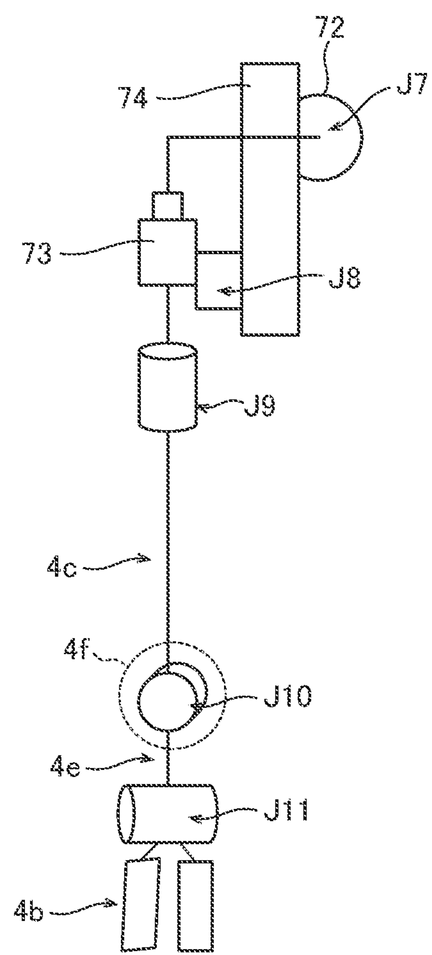
FIG. 12 is a diagram showing rotation axes (a linear motion axis) of a translation mechanism and a surgical instrument.

As shown in FIG. 12, the surgical instrument 4 (pair of forceps 4*b*) includes a J9 axis as a rotation axis (an axis along the direction in which the shaft 4*c* extends) of the shaft 4*c*, the J10 axis as a rotation axis of the second support 4*f* connected to the shaft 4*c*, the J11 axis as an axis about which the pair of forceps 4*b* rotates with respect to the first support 4*e*, and a J12 axis as an opening/closing axis of the pair of forceps 4*b*. A plurality of (four, for example) servomotors M2 provided in the holder 71 of the manipulator arm 60 are provided, and the driven unit 4*a* is driven by the plurality of servomotors M2. Thus, the surgical instrument 4 is driven around the J9 to J12 axes.

A control flow from the operation manipulator arms 21 to the manipulator arm 60 is now described with reference to FIG. 13.

An operation for the surgical instrument 4 is received by the operation manipulator arms 21 of the remote control apparatus 2.

The arm controller 31*a* of the controller 31 includes a surgical instrument posture controller 31*c*, an interference avoider 31*e*, a surgical instrument inverse kinematics calculator 31*h*, and an arm joint controller 31*d*. The arm joint controller 31*d* includes a redundant joint controller 31*f* and an arm inverse kinematics calculator 31*g*.

The surgical instrument posture controller 31*c* receives target position/posture commands for the surgical instrument 4 with respect to the received operation from the operation manipulator arms 21, and also receives position information on the pivot position PP (PP1 or PP2). The surgical instrument posture controller 31*c* calculates the target position/posture of the surgical instrument 4 based on the target position/posture commands, the position information on the pivot position PP, and avoidance angles calculated by the interference avoider 31*e*. The calculated target position/posture of the surgical instrument 4 is input to the surgical instrument inverse kinematics calculator 31*h*. The surgical instrument inverse kinematics calculator 31*h* calculates target rotation angle commands for the surgical instrument 4 based on the target position/posture of the surgical instrument 4 and a joint movable range, and transmits the target rotation angle commands for the surgical instrument 4 to the servo controllers C2 of the surgical instrument 4. The servo controllers C2 drive the surgical instrument 4 based on the transmitted target rotation angle commands.

The surgical instrument posture controller 31*c* calculates a target position/posture of the tip end of the manipulator arm 60 based on the target position/posture commands, the position information on the pivot position PP, and avoidance angles calculated by the interference avoider 31*e*. The calculated target position/posture of the tip end of the manipulator arm 60 is transmitted to the arm inverse kinematics calculator 31*g*.

The joint movable range is input to the arm inverse kinematics calculator 31*g*. Then, the arm inverse kinematics calculator 31*g* calculates target joint angle commands for the manipulator arm 60 based on the target position/posture of the tip end of the manipulator arm 60, redundant joint angles, and the joint movable range, and transmits the target joint angle commands for the manipulator arm 60 to the servo controllers C1 and C3 of the manipulator arm 60. The servo controllers C1 and C3 drive the manipulator arm 60 based on the transmitted target joint angle commands for the manipulator arm 60.

The actual joint angles of the manipulator arm 60 are input from the manipulator arm 60 to the redundant joint controller 31*f* and the interference avoider 31*e*. Furthermore, a minimum accessible distance and the width W of the surgical instrument 4 are input to the interference avoider 31*e*. Then, the interference avoider 31*e* calculates avoidance angles (a rotation amount for moving the manipulator arm 60 such that a first reference line L1 moves along the outer edge of an approach prohibited range A described below) based on the actual joint angles of the manipulator arm 60, the minimum accessible distance, and the width W of the surgical instrument 4, and transmits the avoidance angles to the surgical instrument posture controller 31*c*.

Constraint conditions are input to the redundant joint controller 31*f*. The redundant joint controller 31*f* then transmits the redundant joint angles (for two redundant axes among the eight axes of the manipulator arm 60) calculated based on the actual joint angles of the manipulator arm 60 and the constraint conditions to the arm inverse kinematics calculator 31*g*.

Configuration of Controller for Arm Interference Avoidance Control

The specific configuration of the controller 31 for an arm interference avoidance control is now described. The controller 31 performs a control to operate the surgical instrument 4 based on an operation received by the operation manipulator arms 21. In the following description, it is assumed that the manipulator arm 60*c* to which the endoscope 6 is attached is in a stopped state (not a target to be operated). Furthermore, it is assumed that the manipulator arm 60*b* arranged adjacent to the manipulator arm 60*c* to which the endoscope 6 is attached on the arm base 50 is operated by the operation manipulator arms 21.

In the following description, a direction in which the surgical instrument 4 attached to the manipulator arm 60*b* extends is defined as the Za direction, and a direction orthogonal to the Za direction is defined as a Ya direction (or an Xa direction). A direction in which the endoscope 6 attached to the manipulator arm 60*c* extends is defined as a Zb direction, and a direction orthogonal to the Zb direction is defined as a Yb direction (or an Xb direction).

Figure 14:
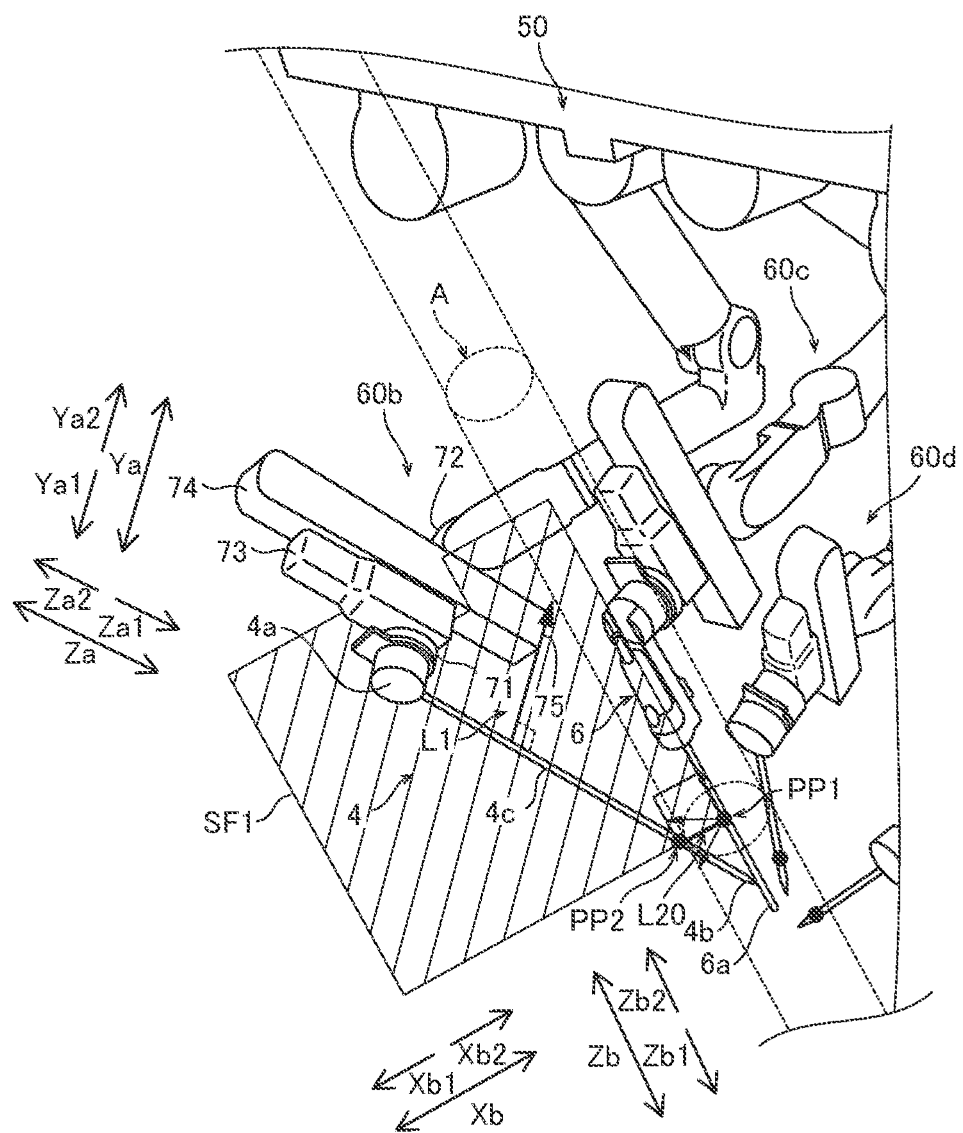
FIG. 14 is a diagram for illustrating an approach prohibited range and a first reference line according to the first embodiment of the present disclosure.
Figure 15:
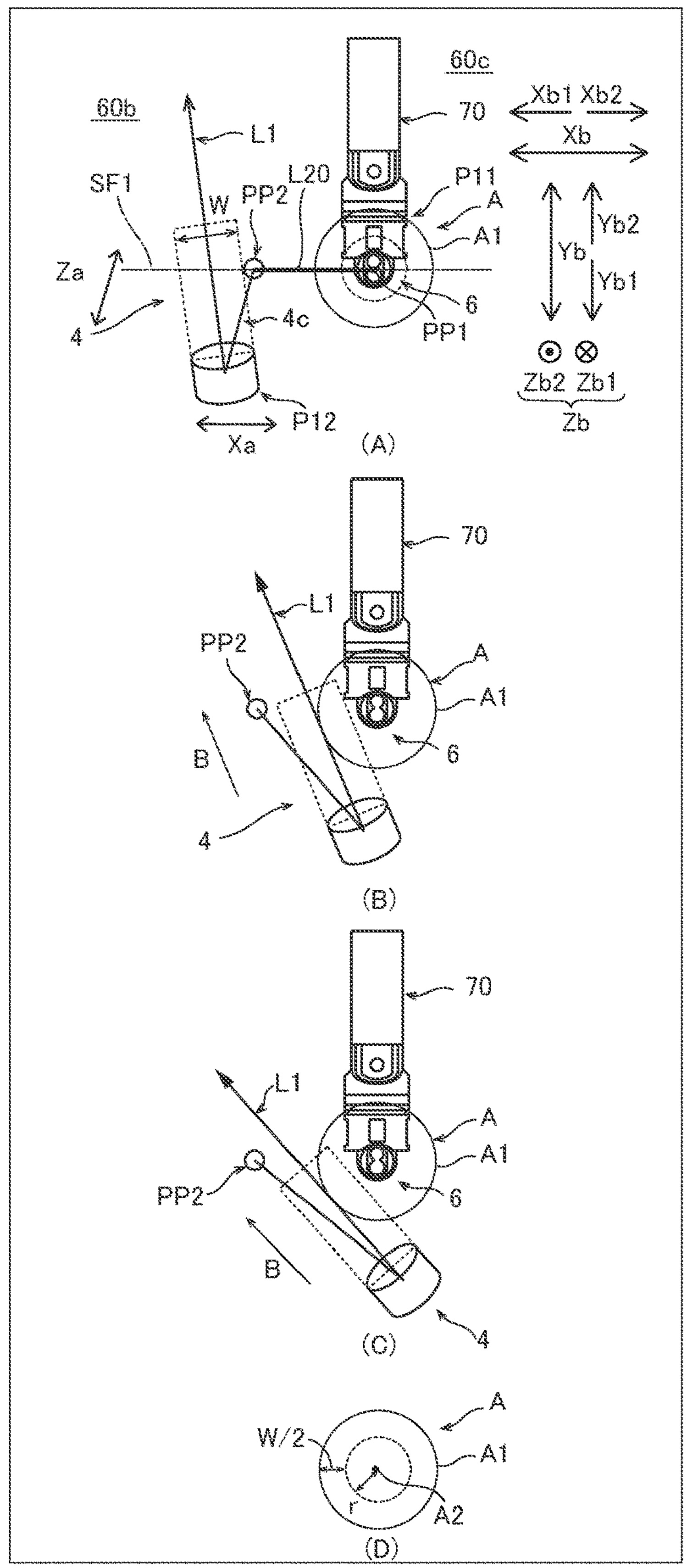
FIG. 15 is a diagram for illustrating the first reference line that moves along the tangential direction of the approach prohibited range.

As shown in FIG. 14, in the first embodiment, the controller 31 (arm joint controller 31*d*) sets the approach prohibited range A in which approach to the endoscope 6 attached to the manipulator arm 60*c* of the plurality of manipulator arms 60 is prohibited. The approach prohibited range A is a space set such that the manipulator arm 60*b* does not collide with the manipulator arm 60*c* and having a substantially cylindrical shape, the axis of which is a straight line in the direction (Zb direction) in which the endoscope 6 extends.

As shown in FIG. 15A, the radius of the approach prohibited range A is the sum of a minimum accessible distancer (see FIG. 15D) to which the endoscope 6 attached to the manipulator arm 60*c* can be approached and half (W/2; see FIG. 15D) the width W of the surgical instrument 4 attached to the manipulator arm 60*b*, as viewed along the Zb direction, for example. The width W of the surgical instrument 4 refers to the width W in the X direction orthogonal to the Zb direction in the manipulator arm 60*b*.

The controller 31 (arm joint controller 31*d*) performs the following controls (setting of the first reference line L1, calculation of a first rotation amount, and comparison between the first rotation amount and a second rotation amount) when the surgical instrument 4 attached to the manipulator arm 60*b* approaches within the approach prohibited range A of the manipulator arm 60*c*.

As shown in FIG. 14, in the first embodiment, the controller 31 (arm joint controller 31*d*) sets the first reference line L1 that is orthogonal to the Za direction in which the surgical instrument 4 extends and that passes through the coupling link 74 of the manipulator arm 60 connected to the tip end side link 73 to which the surgical instrument 4 is attached. Specifically, the first reference line L1 is orthogonal to the Za direction in which the shaft 4*c* extends, and tangent to an end 75 of the coupling link 74 on the tip end side (Za1 direction side) of the shaft 4*c*. The first reference line L1 is a vector extending in a Ya2 direction from the shaft 4*c* and being tangent to (along) the end 75 of the coupling link 74 of the translation mechanism 70 on the Za1 direction side. In other words, the first reference line L1 contacts a portion (end 75) of the translation mechanism 70 that is closest to the trocar T (port). The port refers to a hole provided on the body surface S of the patient P and into which the surgical instrument 4 is inserted. The first reference line L1 is an example of a reference line.

Then, the controller 31 (arm joint controller 31*d*) calculates the amount of rotation (hereinafter referred to as the first rotation amount) of the manipulator arm 60*b* for rotating the manipulator arm 60 about the shaft 4*c* such that the first reference line L1 is along the outer edge of the approach prohibited range A. Specifically, the controller 31 calculates the first rotation amount of the manipulator arm 60*b* for rotating the manipulator arm 60*b* about the shaft 4*c* such that the first reference line L1 is along the tangential direction of the outer peripheral surface A1 of the substantially cylindrical approach prohibited range A.

In the first embodiment, when the first rotation amount of the manipulator arm 60*b* when the arm interference avoidance control (see FIG. 15) is performed is larger than the amount of rotation (hereinafter referred to as the second rotation amount) of the manipulator arm 60*b* when a control to rotate the manipulator arm 60*b* about the shaft 4*c* according to a received operation is performed, the arm interference avoidance control is performed. That is, the controller 31 compares the second rotation amount with the first rotation amount, and uses the first rotation amount as the amount of rotation of the manipulator arm 60*b* when the first rotation amount is larger than the second rotation amount.

In the first embodiment, as shown in FIGS. 15B and 15C, the controller 31 (arm joint controller 31*d*) performs the arm interference avoidance control to move the manipulator arm 60*b* relative to the manipulator arm 60*c* such that the first reference line L1 moves along the outer edge of the approach prohibited range A (the tangential direction of the outer peripheral surface A1 of the substantially cylindrical approach prohibited range A) when using the first rotation amount as the amount of rotation of the manipulator arm 60*b*. Accordingly, the first rotation amount is larger than the second rotation amount according to the operation received by the operation manipulator arms 21, and thus the manipulator arm 60*b* moves so as to avoid interference with the manipulator arm 60*c*. Thus, when the surgical instrument 4 attached to the manipulator arm 60*b* approaches within the approach prohibited range A of the manipulator arm 60*c*, the controller 31 performs the arm interference avoidance control such that the first reference line L1 moves along the tangential direction (B direction) of the outer peripheral surface A1 of the substantially cylindrical approach prohibited range A.

In the first embodiment, as shown in FIGS. 14 and 15A, the controller 31 (arm joint controller 31*d*) performs the arm interference avoidance control when the first attachment position P11 of the endoscope 6 with respect to the manipulator arm 60*c* and the second attachment position P12 of the surgical instrument 4 with respect to the manipulator arm 60*b* are located on opposite sides with respect to a plane SF1 (Xb-Zb plane) including a straight line L20 (bold line in FIG. 15A) connecting the pivot position PP1 set on the endoscope 6 attached to the manipulator arm 60*c* and the pivot position PP2 set on the surgical instrument 4 attached to the manipulator arm 60*b* and a straight line in the direction (Zb direction) in which the endoscope 6 attached to the manipulator arm 60*c* extends. The "attachment position" refers to a position at which the endoscope 6 (surgical instrument 4) is attached to the manipulator arm 60.

Figure 16:
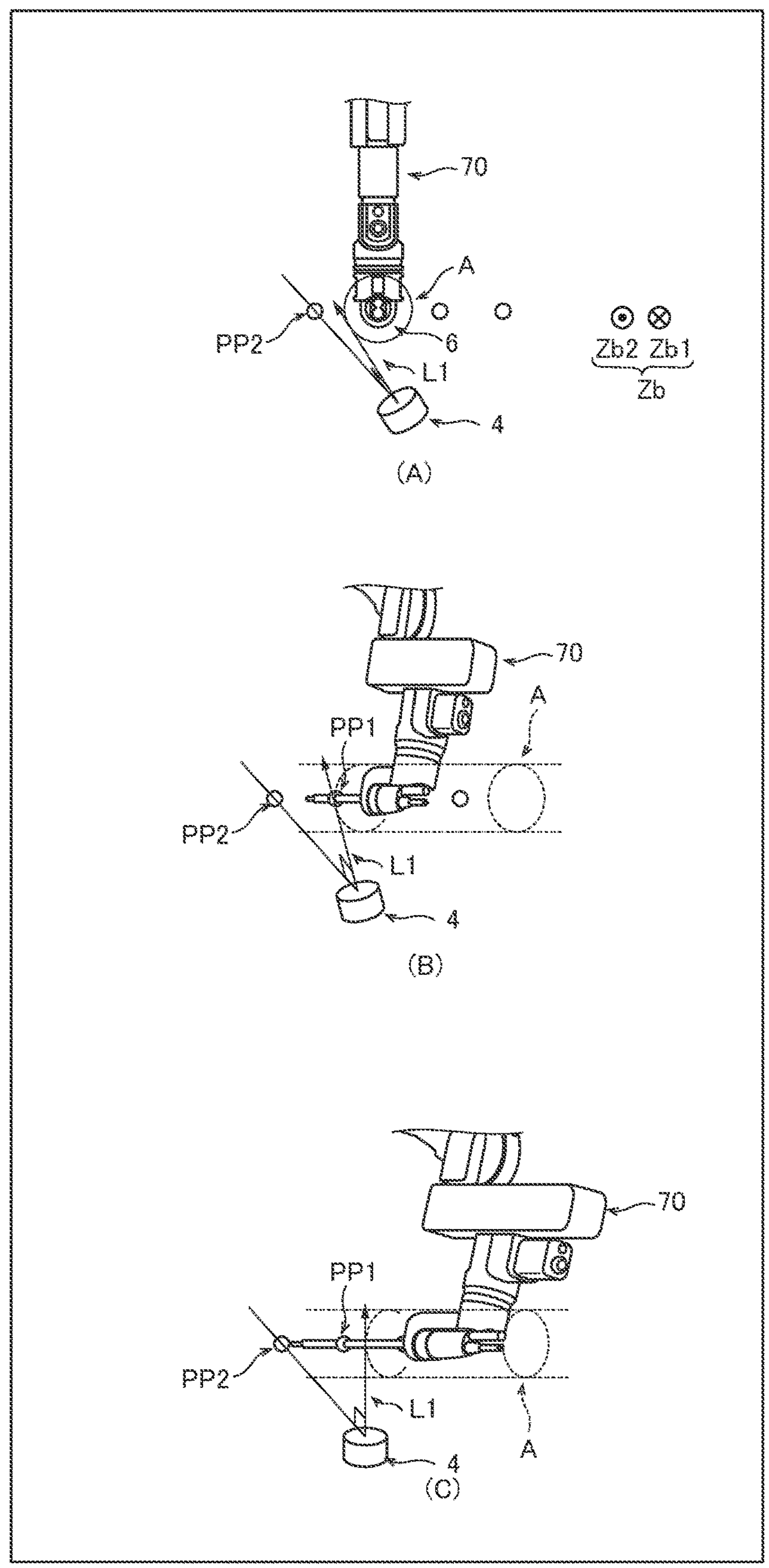
FIG. 16 is a diagram for illustrating a state in which the first reference line that moves along the tangential direction of the approach prohibited range gradually moves to a position based on an operation.

In the first embodiment, as shown in FIG. 16, the controller 31 (arm joint controller 31*d*) performs a control (see FIGS. 16B and 16C) to gradually move the manipulator arm 60*b* to a position based on the received operation when the manipulator arm 60*c* is moved such that a state (see FIG. 16A) in which the manipulator arm 60*b* approaches within the approach prohibited range A of the manipulator arm 60*c* is canceled.

Specifically, in the state (see FIG. 16A) in which the manipulator arm 60*b* approaches within the approach prohibited range A of the manipulator arm 60*c*, the manipulator arm 60*c* is switched to a target to be operated, and the manipulator arm 60*c* is moved. At this time, the manipulator arm 60*c* moves to tilt without moving the pivot position PP1 of the endoscope 6. In this case, the approach prohibited range A also tilts as the manipulator arm 60*c* tilts. Thus, the state (see FIG. 16A) in which the manipulator arm 60*b* approaches within the approach prohibited range A of the manipulator arm 60*c* is canceled. After that, the manipulator arm 60*b* is controlled (see FIGS. 16B and 16C) to gradually move to the position based on the received operation. At this time, the manipulator arm 60*b* is moved while the pivot position PP2 of the surgical instrument 4 remains stationary. A gradual return operation may be started not only when the manipulator arm 60*b* is not a target to be operated, but also after the manipulator arm 60*b* is switched to a target to be operated.

Control Method for Surgical System

Figure 17:
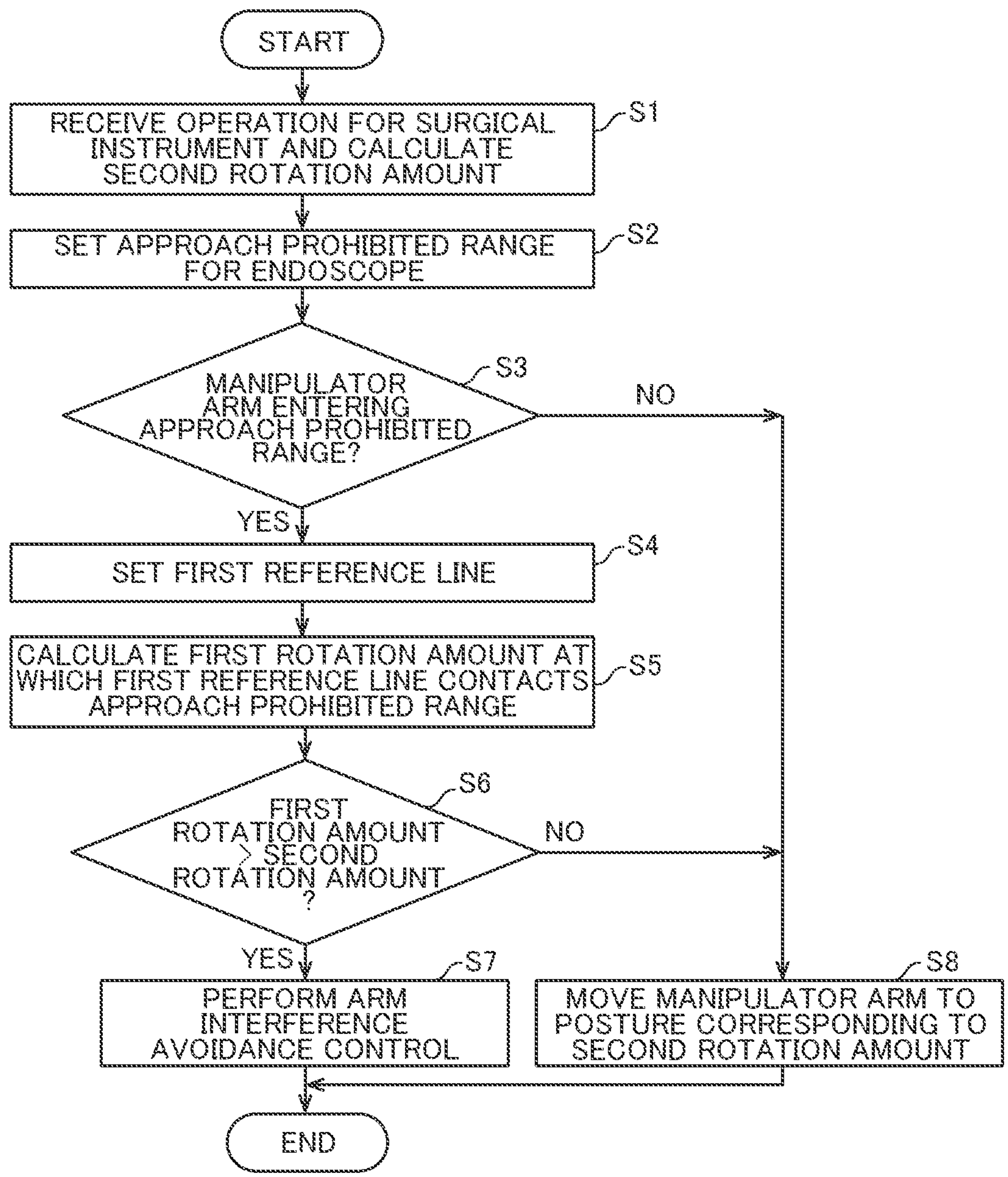
FIG. 17 is a flowchart for illustrating a control method for the surgical system according to the first embodiment of the present disclosure.

A control method for the surgical system 100 (the arm interference avoidance control for the manipulator arm 60*b*) is now described with reference to FIG. 17. It is assumed that the first attachment position P11 of the endoscope 6 with respect to the manipulator arm 60*c* and the second attachment position P12 of the surgical instrument 4 with respect to the manipulator arm 60*b* are located on the opposite sides with respect to the plane SF1 (Xb-Zb plane) (see FIG. 15A).

First, in step S1, the controller 31 (arm controller 31*a*) receives an operation for the surgical instrument 4 by the operation manipulator arms 21. Then, the controller 31 calculates the second rotation amount according to the received operation.

Then, in step S2, the controller 31 (arm controller 31*a*) sets the approach prohibited range A in which approach to the endoscope 6 attached to the manipulator arm 60*c* of the plurality of manipulator arms 60 is prohibited.

Then, in step S3, the controller 31 (arm controller 31*a*) determines whether or not the manipulator arm 60*b* (the arm portion 61 and the translation mechanism 70) enters the approach prohibited range A with respect to the received operation.

In a case of YES in step S3, in step S4, the first reference line L1 that is orthogonal to the Za direction in which the surgical instrument 4 (shaft 4*c*) extends and that passes through the coupling link 74 (is tangent to the end 75) is set.

In step S5, the first rotation amount of the manipulator arm 60*b* for moving the manipulator arm 60*b* such that the first reference line L1 is along the outer edge (tangential direction) of the approach prohibited range A is calculated.

In step S6, the controller 31 (arm controller 31*a*) compares the second rotation amount with the first rotation amount, and determines whether or not the first rotation amount is larger than the second rotation amount.

In a case of YES in step S6, in step S7, the arm interference avoidance control to move the manipulator arm 60*b* relative to the manipulator arm 60*c* such that the first reference line L1 moves along the outer edge (tangential direction) of the approach prohibited range A is performed. That is, when the manipulator arm 60*b* approaches within the approach prohibited range A of the manipulator arm 60*c*, the controller 31 performs the arm interference avoidance control to move the manipulator arm 60*b* relative to the manipulator arm 60*c*.

In a case of NO in step S3 and in a case of NO in step S6, the controller 31 gradually moves the manipulator arm 60*b* to a posture corresponding to the second rotation amount in step SB.

The operations in step S1 to step S8 described above are constantly performed during operation of the manipulator arm 60. Although the manipulator arm 60*b* adjacent to one side of the manipulator arm 60*c* to which the endoscope 6 is attached is described above, the arm interference avoidance control is similarly performed for the manipulator arm 60*d* adjacent to the other side of the manipulator arm 60*c*.

Advantages of First Embodiment

According to the first embodiment, the following advantages are achieved.

Advantages of Surgical System and Medical Manipulator

According to the first embodiment, as described above, the controller 31 is configured or programmed to perform the arm interference avoidance control to move the manipulator arm 60*b* relative to the manipulator arm 60*c* such that the first reference line L1 moves along the outer edge of the approach prohibited range A when the manipulator arm 60*b* approaches within the approach prohibited range A of the manipulator arm 60*c*.

Accordingly, when the manipulator arm 60*b* approaches within the approach prohibited range A of the manipulator arm 60*c*, the first reference line L1 is moved along the outer edge of the approach prohibited range A such that the manipulator arm 60*b* moves while turning around the manipulator arm 60*c*. Consequently, approach of the manipulator arm 60*b* to the manipulator arm 60*c* is reduced or prevented, and thus interference between the manipulator arms 60 can be avoided. Furthermore, interference between the manipulator arms 60 can be avoided only by moving the first reference line L1 set for the manipulator arm 60*b* along the outer edge of the approach prohibited range A of the manipulator arm 60*c*, and thus a control to avoid the interference can be facilitated as compared with a case in which approach prohibited ranges A are set for both the manipulator arms 60*c* and 60*b*, and a virtual displacement force between the approach prohibited ranges A is calculated. Consequently, interference between the manipulator arms 60 can be avoided while a control to avoid the interference is facilitated.

According to the first embodiment, as described above, the approach prohibited range A is a space having a substantially cylindrical shape, the axis of which is along the Zb direction in which the endoscope 6 extends, and set such that the manipulator arm 60*b* does not collide with the manipulator arm 60*c*, and the controller 31 is configured or programmed to perform the arm interference avoidance control such that the first reference line L1 moves along the tangential direction of the outer peripheral surface A1 of the substantially cylindrical approach prohibited range A when the surgical instrument 4 attached to the manipulator arm 60*b* approaches within the approach prohibited range A of the manipulator arm 60*c*. Accordingly, the approach prohibited range A is set in a substantially cylindrical shape extending in the Zb direction in which the endoscope 6 extends, and thus interference between the manipulator arms 60 can be avoided within a relatively wide range in which the substantially cylindrical approach prohibited range A extends.

According to the first embodiment, as described above, the first reference line L1 is set to be orthogonal to the direction in which the shaft 4*c* extends, which is in the Za direction in which the surgical instrument 4 extends, and to be tangent to the end 75 of the coupling link 74 on the tip end side of the shaft 4*c*. Furthermore, the controller 31 is configured or programmed to perform the arm interference avoidance control such that the first reference line L1 moves along the outer edge of the approach prohibited range A. The end 75 of the coupling link 74 on the tip end side of the shaft 4*c* is relatively likely to interfere with the manipulator arm 60*c* (or the endoscope 6 attached to the manipulator arm 60*c*). Therefore, as described above, the arm interference avoidance control is performed such that the first reference line L1 tangent to the end 75 of the coupling link 74 on the tip end side of the shaft 4*c* moves along the outer edge of the approach prohibited range A, and thus interference of the end 75 of the coupling link 74 on the tip end side of the shaft 4*c*, which is relatively likely to interfere, can be effectively reduced or prevented.

According to the first embodiment, as described above, the controller 31 is configured or programmed to perform the arm interference avoidance control when the first rotation amount of the manipulator arm 60*b* when the arm interference avoidance control is performed is larger than the second rotation amount of the manipulator arm 60*b* when a control to move the manipulator arm 60*b* according to the received operation is performed. Accordingly, the manipulator arm 60*b* is moved based on the larger one of the first rotation amount of the arm interference avoidance control and the second rotation amount of the control according to the received operation (that is, the manipulator arm 60*b* is moved farther away from the manipulator arm 60*c*), and thus interference between the manipulator arms 60 can be further reduced or prevented.

According to the first embodiment, as described above, the controller 31 is configured or programmed to perform the arm interference avoidance control when the first attachment position P11 of the endoscope 6 with respect to the manipulator arm 60*c* and the second attachment position P12 of the surgical instrument 4 with respect to the manipulator arm 60*b* are located on the opposite sides with respect to the plane SF1 including the straight line L20 connecting the pivot position PP1 set on the endoscope 6 attached to the manipulator arm 60*c* and the pivot position PP2 set on the surgical instrument 4 attached to the manipulator arm 60*b* and the straight line in the direction in which the endoscope 6 attached to the manipulator arm 60*c* extends. When the first attachment position P11 of the endoscope 6 with respect to the manipulator arm 60*c* and the second attachment position P12 of the surgical instrument 4 with respect to the manipulator arm 60*b* are located on the same side with respect to the plane SF1, the manipulator arms 60*c* and 60*b* may interfere with each other when the manipulator arm 60*b* is moved such that the first reference line L1 moves along the outer edge of the approach prohibited range A. Therefore, with the configuration described above, interference between the manipulator arms 60 can be appropriately reduced or prevented.

According to the first embodiment, as described above, the controller 31 is configured or programmed to perform a control to gradually return the manipulator arm 60*b* to the position based on the received operation when the manipulator arm 60*c* is moved such that the state in which the manipulator arm 60*b* approaches within the approach prohibited range A of the manipulator arm 60*c* is canceled. Alternatively, the manipulator arm 60*b* may be gradually returned after it becomes a target to be operated again. Thus, an operating range narrowed by the avoidance operation can be restored.

According to the first embodiment, as described above, the remote control apparatus 2 includes the arm base 50 to which the plurality of manipulator arms 60 are attached, and the manipulator arm 60*c* and the manipulator arm 60*b* are arranged adjacent to each other. When the manipulator arm 60*c* and the manipulator arm 60*b* are arranged adjacent to each other on the arm base 50, the manipulator arm 60*c* and the manipulator arm 60*b* are particularly likely to interfere with each other, and thus performing the arm interference avoidance control such that the first reference line L1 moves along the outer edge of the approach prohibited range A is particularly effective.

According to the first embodiment, as described above, each of the manipulator arms 60 (60*a* to 60*d*) includes the seven or more joint axes. The posture of the manipulator arm 60 for maintaining the pivot position PP that serves as a fulcrum for movement of the surgical instrument 4 can be determined by the amount of rotation (movement) of the six joint axes of the manipulator arm 60, and thus the manipulator arm 60 includes the seven or more joint axes such that a redundant axis is generated. That is, the manipulator arm 60*b* can take a different posture while maintaining the pivot position PP. Therefore, the manipulator arm 60 includes the seven or more joint axes such that the posture of the manipulator arm 60*b* can be changed so as to reduce or prevent interference with the manipulator arm 60*c* while maintaining the pivot position PP.

Advantages of Control Method for Surgical System

According to the first embodiment, as described above, the control method for the surgical system 100 includes step S7 of performing the arm interference avoidance control to move the manipulator arm 60*b* relative to the manipulator arm 60*c* such that the first reference line L1 moves along the outer edge of the approach prohibited range A when the manipulator arm 60*b* approaches within the approach prohibited range A of the manipulator arm 60*c*. Accordingly, the manipulator arm 60*b* moves while turning around the manipulator arm 60*c*, and thus interference between the manipulator arms 60 can be avoided while a control to avoid the interference is facilitated as compared with a case in which approach prohibited ranges A are set for both the manipulator arms 60*c* and 60*b*, and a virtual displacement force is calculated.

Second Embodiment

The configuration of a surgical system 200 according to a second embodiment is now described.

Figure 18:
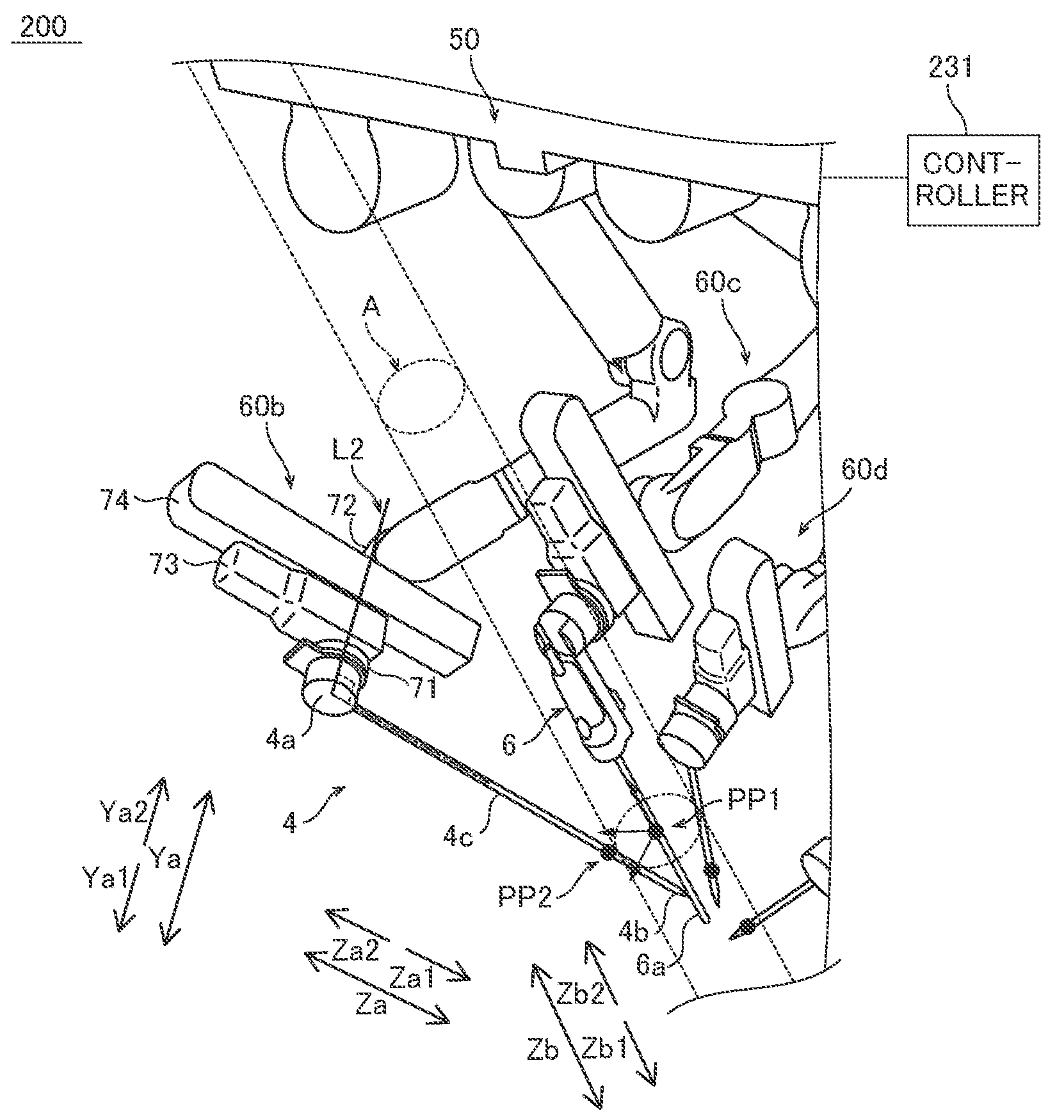
FIG. 18 is a diagram for illustrating an approach prohibited range and a second reference line according to a second embodiment of the present disclosure.

As shown in FIG. 18, in the second embodiment, a second reference line L2 that is orthogonal to a Za direction in which a shaft 4*c* extends and that passes through the rotation center of a J7 axis about which a coupling link 74 is rotated (the rotation center D of a base end side link 72; see FIG. 19) is set. A controller 231 performs an arm interference avoidance control such that the second reference line L2 moves along the outer edge of an approach prohibited range A. The second reference line L2 is an example of a reference line. A specific description is given below.

A pivot position PP2 that serves as a fulcrum for movement of a surgical instrument 4 attached to a manipulator arm 60 is set for the manipulator arm 60 (manipulator arm 60*b*). In the second embodiment, the controller 231 presets a reference point RP to radially move the surgical instrument 4 with respect to the pivot position PP2 that serves as a fulcrum for movement of the surgical instrument 4 attached to the manipulator arm 60*b* on a straight line along a J1 axis. Specifically, a reference point RP1 is set such that the center of a J8 axis (the center of a range in which the J8 axis that moves linearly moves) and the rotation center D of the J7 axis are arranged along a direction of a perpendicular line normal to the shaft 4*c* of the surgical instrument 4 and drawn from the reference point RP on the J1 axis. A specific description is given below.

Figure 19:
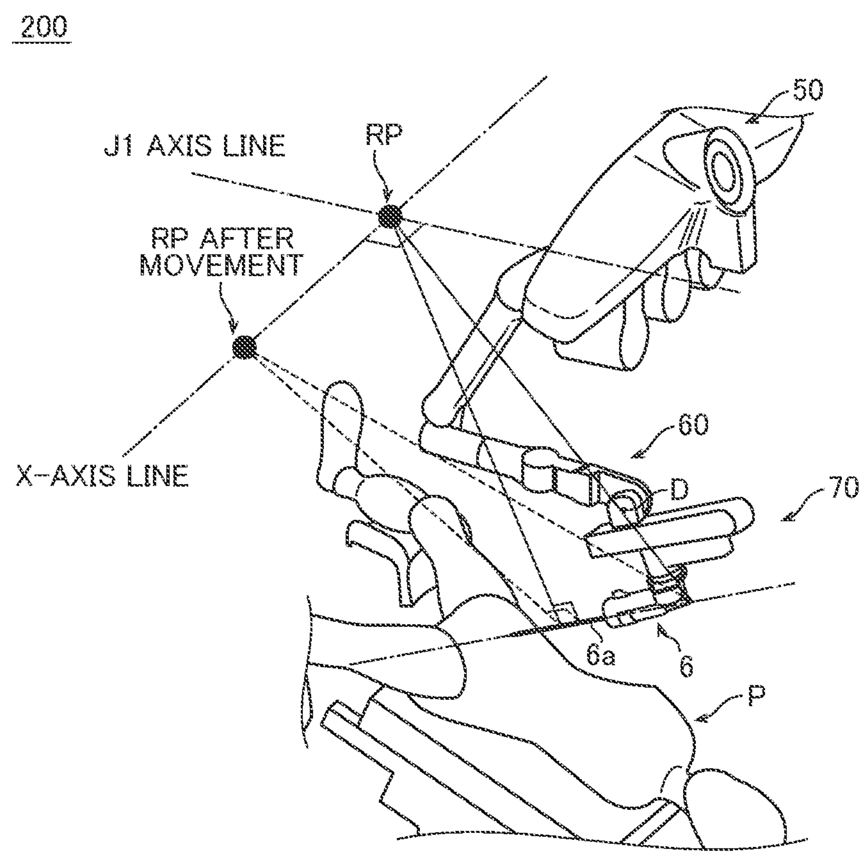
FIG. 19 is a diagram for illustrating the second reference line and a reference point according to the second embodiment of the present disclosure.
Figure 20:
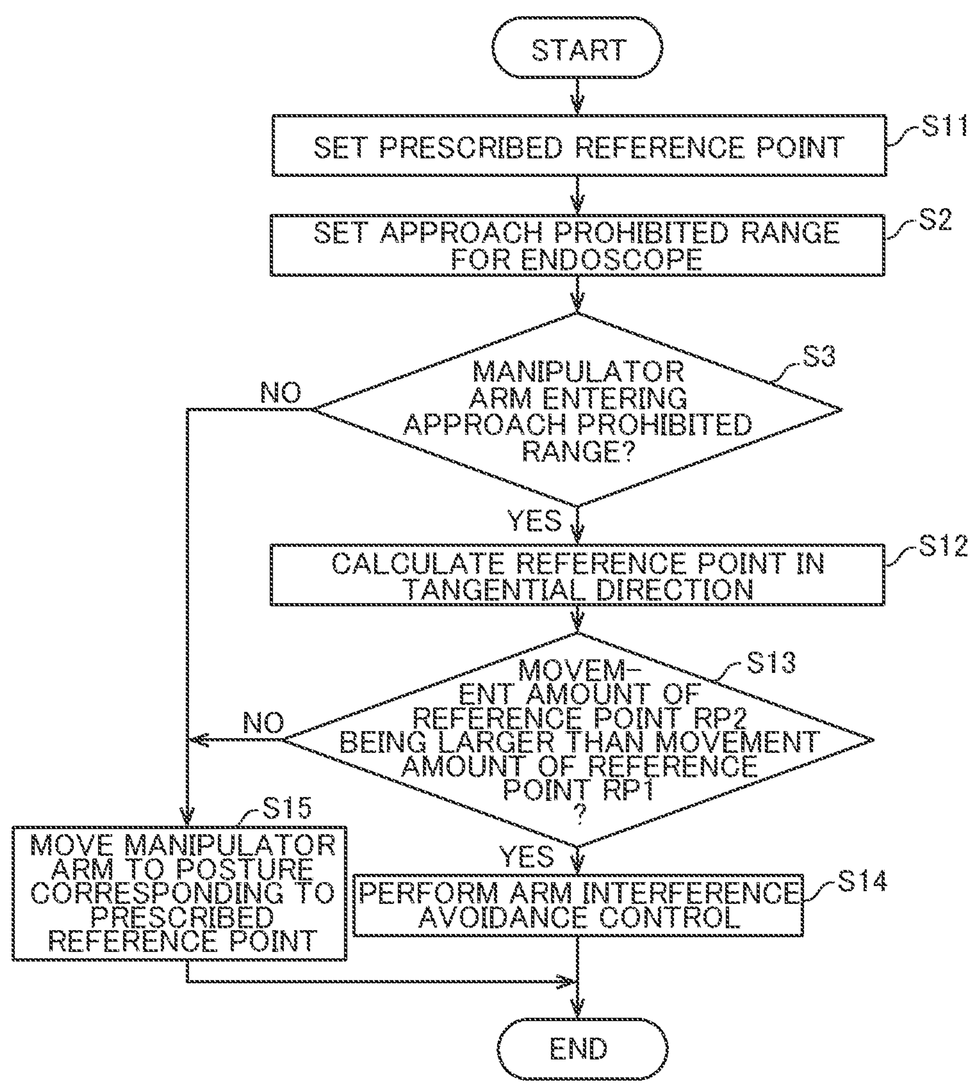
FIG. 20 is a flowchart for illustrating a control method for the surgical system according to the second embodiment of the present disclosure.

As shown in FIG. 19, in step S11 (see FIG. 20), the controller 231 receives an operation for the surgical instrument 4 by operation manipulator arms 21. Then, the controller 231 moves the reference point RP in an x-axis direction according to the arrangement position of the manipulator arm 60. A reference point after movement is set as a prescribed reference point RP1. Although FIG. 19 shows the reference point RP1 of a manipulator arm 60*c* to which an endoscope 6 is attached, the same applies to the manipulator arm 60*c* to which the surgical instrument 4 is attached.

Operations in step S2 and step S3 are the same as those of the first embodiment.

Then, in step S12, a reference point RP2 is calculated such that the second reference line L2, which is set to pass through the center of the J8 axis provided in a translation mechanism 70 and the rotation center D of the J7 axis provided in the translation mechanism 70, is along the outer edge (tangential direction) of the approach prohibited range A. Specifically, first, the coordinate system of the endoscope 6 of the manipulator arm 60*c* is defined. The origin is a pivot position PP1 of the manipulator arm 60*c* (endoscope 6). A y-axis is along the outer product direction of a vector connecting the pivot position PP1 and the pivot position PP2 of the manipulator arm 60*b* (surgical instrument 4) and the axial vector (z-axis) of a shaft 6*a* of the endoscope 6. The x-axis is along the outer product direction of the axial vector of the shaft 6*a* of the endoscope 6 and a y-axis vector.

Then, the origin of the surgical instrument 4 of the manipulator arm 60*b* is projected onto the xy-plane of the coordinate system of the endoscope 6. The origin of the surgical instrument 4 refers to the origin of the coordinate system that controls the surgical instrument 4.

Then, the reference point RP2 is calculated such that the second reference line L2 is along the tangential direction of the approach prohibited range A in the coordinate system of the endoscope 6. The reference point RP2 is located on an x-axis line orthogonal to a J1 axis line. Thus, the reference point RP2 is moved such that the reference point RP2 is located on an extension of the second reference line L2.

Then, in step S13, the controller 31 determines whether or not the movement amount of the reference point RP2 after movement is larger than the movement amount of the reference point RP1 (the movement amount from the reference point RF) (the reference point RP2 is spaced farther apart from the J1 axis as compared with the reference point RP1).

Figure 21:
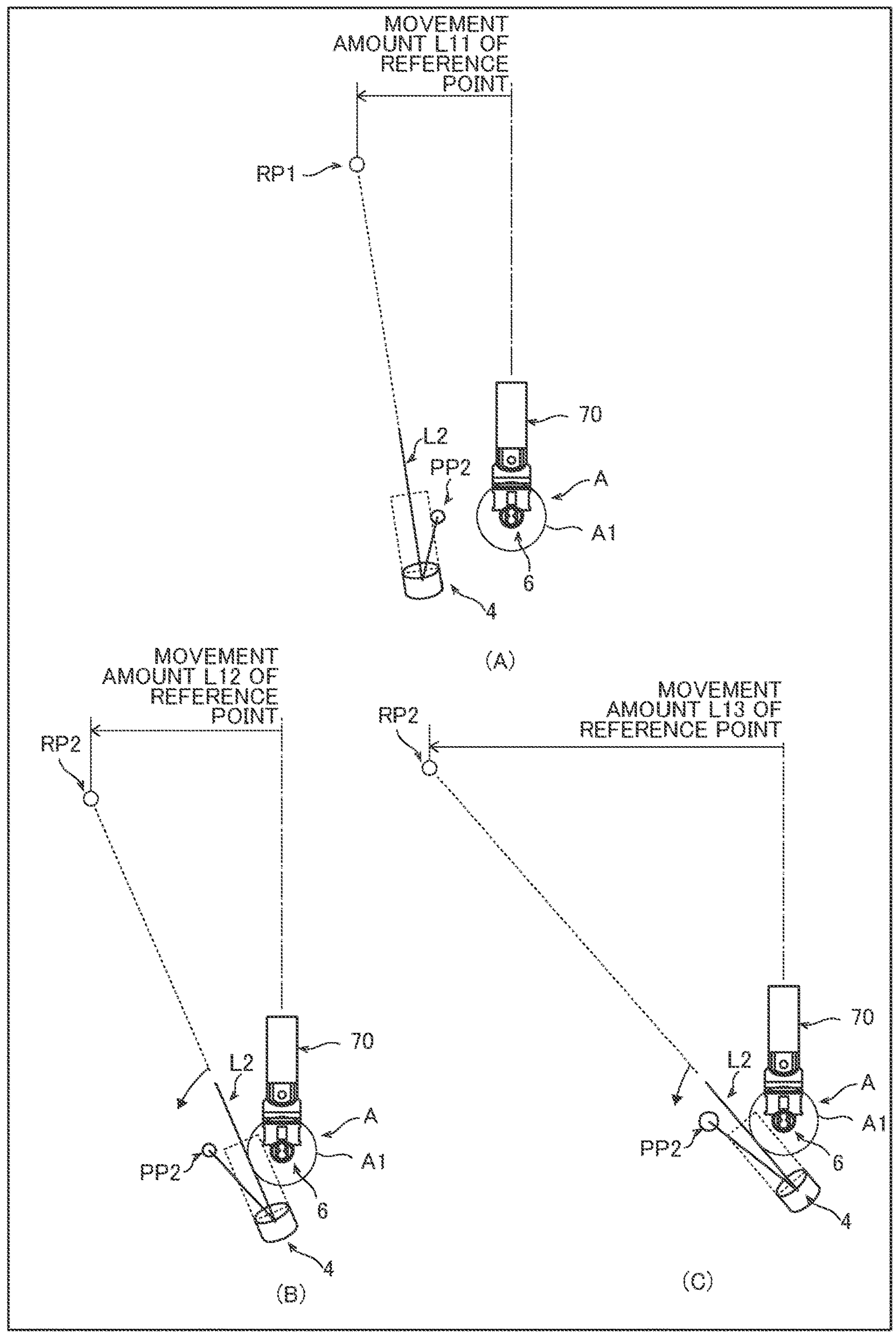
FIG. 21 is a diagram for illustrating the second reference line that moves along the tangential direction of the approach prohibited range.

In a case of YES in step S13, in step S14, the arm interference avoidance control is performed such that the second reference line L2 moves along the outer edge of the approach prohibited range A. For example, when the movement amount L12 (L13) of the reference point RP2 at which the second reference line L2 is along the tangential direction of the approach prohibited range A is larger than the movement amount L11 of the reference point RP1 according to the predetermined arrangement position of the manipulator arm 60 shown in FIG. 21A, as shown in FIGS. 21B and 21C, the arm interference avoidance control is performed. Thus, in the second embodiment, the controller 231 performs the arm interference avoidance control such that the second reference line L2 moves along the outer edge of the approach prohibited range A by moving the reference point RP2 on the extension of the second reference line L2 when the manipulator arm 60*b* approaches within the approach prohibited range A of the manipulator arm 60*c*.

In a case of NO in step S3 or step S13, the process advances to step S15, and the manipulator arm 60*b* is moved to a posture corresponding to the prescribed reference point RP1.

Advantages of Second Embodiment

According to the second embodiment, the following advantages are achieved.

According to the second embodiment, as described above, the second reference line L2 is set to be orthogonal to the direction in which the shaft 4*c* extends and to pass through the rotation center D of the J7 axis about which the coupling link 74 is rotated. The controller 231 is configured or programmed to perform the arm interference avoidance control such that the second reference line L2 moves along the outer edge of the approach prohibited range A. Accordingly, the translation mechanism 70, which is relatively likely to interference, is moved along the outer edge of the approach prohibited range A, and thus interference between the manipulator arms 60 can be effectively reduced or prevented.

According to the second embodiment, as described above, the controller 231 is configured or programmed to preset the reference point RP to radially move the surgical instrument 4 with respect to the pivot position PP1 that serves as a fulcrum for movement of the surgical instrument 4 attached to the manipulator arm 60 on the straight line along the J1 axis, and perform the arm interference avoidance control by moving the reference point RP2 such that the second reference line L2 moves along the outer edge of the approach prohibited range A when the manipulator arm 60*b* approaches within the approach prohibited range A of the manipulator arm 60*c*. Accordingly, the arm interference avoidance control can be performed using the preset reference point RP, and thus a large change in the control of the surgical system 200 can be reduced or prevented.

According to the second embodiment, as described above, the controller 231 is configured or programmed to perform the arm interference avoidance control when the movement amount of the reference point RP2 moved by the arm interference avoidance control is larger than the movement amount of the reference point RP1 based on the received operation. Accordingly, the manipulator arm 60*c* is moved away from the manipulator arm 60*b*, and thus interference between the manipulator arms 60 can be appropriately reduced or prevented.

MODIFIED EXAMPLES

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which interference between the manipulator arm 60*c* and the manipulator arm 60*b* is avoided by moving the manipulator arm 60*b* with respect to the manipulator arm 60*c* has been shown in each of the aforementioned first and second embodiments, the present disclosure is not limited to this. For example, interference between the manipulator arm 60*c* and the manipulator arm 60*b* may be avoided by moving the manipulator arm 60*c* with respect to the manipulator arm 60*b*. Alternatively, interference between the manipulator arm 60*c* and the manipulator arm 60*b* may be avoided by moving both the manipulator arm 60*b* and the manipulator arm 60*c*.

Figure 22:
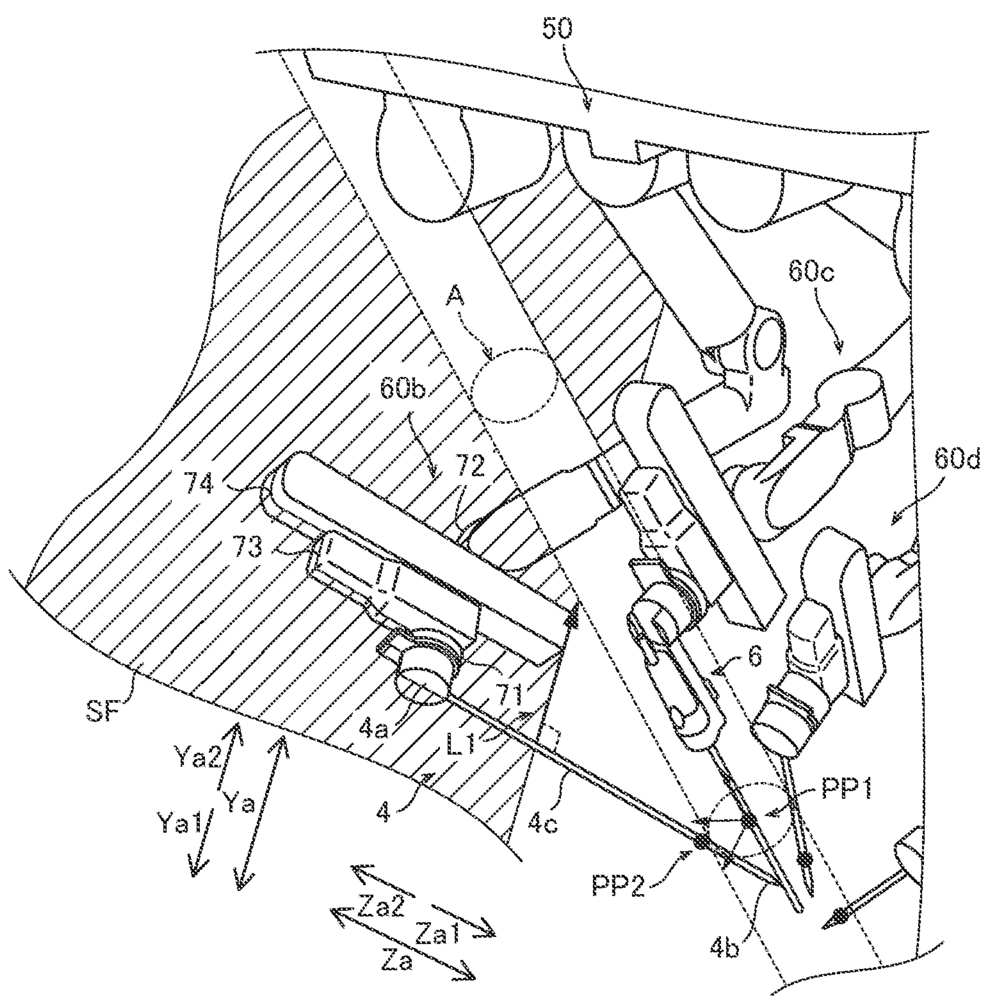
FIG. 22 is a diagram for illustrating an approach prohibited range and a plane that moves along the tangential direction of the approach prohibited range according to a modified example.

While the example in which the manipulator arm 60*b* is moved such that the first reference line L1 (second reference line L2) moves along the outer edge of the approach prohibited range A has been shown in each of the aforementioned first and second embodiments, the present disclosure is not limited to this. For example, as shown in FIG. 22, a plane SF, which is a portion on the base end side of a shaft 4*c* (Za-axis) with respect to a first reference line L1 (vector) perpendicular to the shaft 4*c* (Za-axis) and passing through a coupling link 74, may be set in a plane spanned by the shaft 4*c* (Za-axis) and the first reference line L1, and a manipulator arm 60*b* may be moved such that the plane SF moves along the outer edge of an approach prohibited range A. Even by moving the manipulator arm 60*b* such that the plane SF moves along the outer edge of the approach prohibited range A in this manner, interference between the manipulator arms 60 can be avoided while a control to avoid the interference is facilitated, similarly to the first and second embodiments.

While the example in which the approach prohibited range A is a space having a substantially cylindrical shape has been shown in each of the aforementioned first and second embodiments, the present disclosure is not limited to this. For example, the approach prohibited range A may have a shape (such as a prismatic shape) other than a substantially cylindrical shape.

While the example in which the first reference line L1 is set to be tangent to the end 75 of the coupling link 74 on the tip end side of the shaft 4*c* has been shown in the aforementioned first embodiment, the present disclosure is not limited to this. For example, when there is a portion of the translation mechanism 70 that is more likely to interfere with the manipulator arm 60*c* than the end 75 of the coupling link 74 on the tip end side of the shaft 4*c*, the first reference line L1 may be set to be tangent to this portion.

While the example in which the arm interference avoidance control is performed when the first attachment position P11 of the endoscope 6 with respect to the manipulator arm 60*c* and the second attachment position P12 of the surgical instrument 4 with respect to the manipulator arm 60*b* are located on the opposite sides with respect to the plane SF1 (Xb-Zb plane) has been shown in the aforementioned first embodiment, the present disclosure is not limited to this. For example, the coordinate system of the endoscope 6 may be defined as in the second embodiment, and the arm interference avoidance control may be performed when the surgical instrument 4 is located on the positive side of the y-axis of the coordinate system of the endoscope 6.

Figure 23:
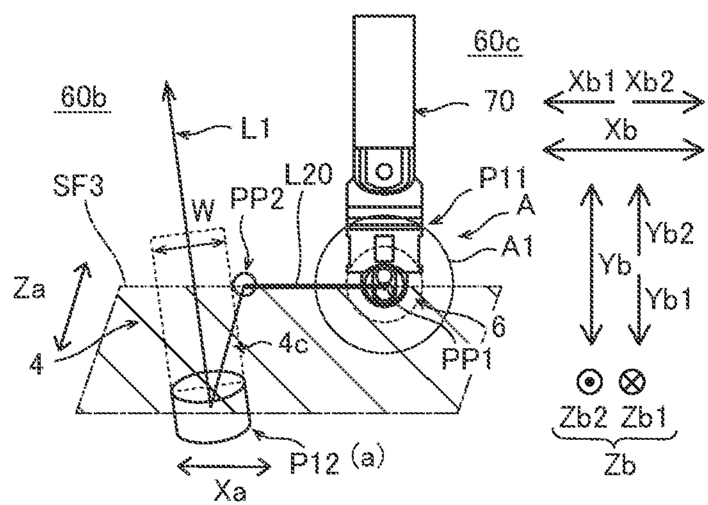
FIG. 23 is a diagram for illustrating a plane for an arm interference avoidance control according to a modified example.

While the example in which the plane SF1 is the Xb-Zb plane has been shown in the aforementioned first embodiment, the present disclosure is not limited to this. For example, as shown in FIG. 23, a plane SF3 (Xa-Za plane) including the straight line L20 connecting the pivot position PP1 set on the endoscope 6 attached to the manipulator arm 60*c* and the pivot position PP2 set on the surgical instrument 4 attached to the manipulator arm 60*b*, and a straight line in the direction (Za direction) in which the surgical instrument 4 attached to the manipulator arm 60*b* extends may be defined. Furthermore, the controller 31 (arm joint controller 31*d*) may perform the arm interference avoidance control when the first attachment position P11 of the endoscope 6 with respect to the manipulator arm 60*c* and the second attachment position P12 of the surgical instrument 4 with respect to the manipulator arm 60*b* are located on opposite sides with respect to the plane SF3 (Xa-Za plane).

While the example in which the manipulator arm 60*b* is gradually moved to the position based on the received operation when the state in which the manipulator arm 60*b* approaches within the approach prohibited range A of the manipulator arm 60*c* is canceled has been shown in each of the aforementioned first and second embodiments, the present disclosure is not limited to this. For example, even when the state in which the manipulator arm 60*b* approaches within the approach prohibited range A of the manipulator arm 60*c* is canceled, the manipulator arm 60*b* may not be moved to the position based on the received operation.

While the example in which four manipulator arms 60 are provided has been shown in each of the aforementioned first and second embodiments, the present disclosure is not limited to this. In the present disclosure, the number of manipulator arms 60 may be any number as long as at least one manipulator arm 60 is provided.

While the example in which each of the arm portion 61 and the positioner 40 includes a 7-axis articulated robot has been shown in each of the aforementioned first and second embodiments, the present disclosure is not limited to this. For example, the arm portion 61 may include an articulated robot with more than seven axes. Furthermore, the positioner 40 may include an articulated robot having an axis configuration (six axes or eight axes, for example) other than the 7-axis articulated robot.

While the example in which all of the manipulator arms 60 include an 8-axis articulated robot has been shown in each of the aforementioned first and second embodiments, the present disclosure is not limited to this. For example, some of the four manipulator arms 60 may include an 8-axis articulated robot.

While the example in which the medical manipulator 1 includes the medical cart 3, the positioner 40, the arm base 50, and the manipulator arms 60 has been shown in each of the aforementioned first and second embodiments, the present disclosure is not limited to this. For example, the medical manipulator 1 may not include the medical cart 3, the positioner 40, or the arm base 50, but may include only the manipulator arms 60.

The functionality of the elements disclosed herein may be implemented using circuitry or processing circuitry that includes general purpose processors, special purpose processors, integrated circuits, application specific integrated circuits (ASICs), conventional circuitry and/or combinations thereof that are configured or programmed to perform the disclosed functionality. Processors are considered processing circuitry or circuitry as they include transistors and other circuitry therein. In the present disclosure, the circuitry, units, or means are hardware that carries out or is programmed to perform the recited functionality. The hardware may be hardware disclosed herein or other known hardware that is programmed or configured to carry out the recited functionality. When the hardware is a processor that may be considered a type of circuitry, the circuitry, means, or units are a combination of hardware and software, and the software is used to configure the hardware and/or processor.

DESCRIPTION OF REFERENCE NUMERALS

1: medical manipulator (patient-side apparatus)
2: remote control apparatus (operator-side apparatus)
4: surgical instrument
4*c*: shaft
21: operation manipulator arm (operation unit)
31: controller
60: manipulator arm
60*c*: manipulator arm (first manipulator arm)
60*b*: manipulator arm (second manipulator arm)
50: arm base
73: tip end side link (first link)
74: coupling link (second link)
75: end
100: surgical system (robotic surgical system)
A: approach prohibited range
A1: outer peripheral surface
A2: center
B: tangential direction
J1: axis (base end axis)
J7: axis (rotation axis)
L1: first reference line (reference line)
L2: second reference line (reference line)
RP1, RP2: reference point
SF: plane

The invention claimed is:

1. A robotic surgical system comprising:
a patient-side apparatus including first and second manipulator arms having tip end sides to which first and second surgical instruments are attached, respectively;
an operator-side apparatus including an operation unit to receive operations for the first and second surgical instruments; and
a controller configured or programmed to perform a control to operate the first and second surgical instruments based on the received operations; wherein
the first and second manipulator arms include first links to which the first and second surgical instruments are attached, respectively, and second links connected to the first links, respectively; and
the controller is configured or programmed to perform operations comprising:
setting an approach prohibited range in which approach to the first surgical instrument attached to the first manipulator arm is prohibited;
setting a reference line orthogonal to a direction in which the second surgical instrument extends, the reference line passing through the second link of the second manipulator arm; and
performing an arm interference avoidance control to move the second manipulator arm relative to the first manipulator arm such that the reference line moves along an outer edge of the approach prohibited range when the second manipulator arm approaches within the approach prohibited range of the first manipulator arm.

2. The robotic surgical system according to claim 1, wherein
the approach prohibited range is a space having a substantially cylindrical shape, an axis of which is along a direction in which the first surgical instrument extends, the space being set such that the second manipulator arm does not collide with the first manipulator arm; and
the controller is configured or programmed to perform the arm interference avoidance control such that the reference line moves along a tangential direction of an outer peripheral surface of the approach prohibited range having the substantially cylindrical shape when the second surgical instrument approaches within the approach prohibited range of the first manipulator arm.

3. The robotic surgical system according to claim 1, wherein the second surgical instrument includes a shaft;

the direction in which the second surgical instrument extends is in a direction in which the shaft extends;

the reference line includes a first reference line orthogonal to the direction in which the shaft extends, the first reference line being tangent to an end of the second link of the second manipulator arm on a tip end side of the shaft; and the controller is configured or programmed to perform the arm interference avoidance control such that the first reference line moves along the outer edge of the approach prohibited range.

4. The robotic surgical system according to claim 3, wherein the controller is configured or programmed to perform the arm interference avoidance control when a rotation amount of the second manipulator arm when the arm interference avoidance control is performed is larger than a rotation amount of the second manipulator arm when a control to move the second manipulator arm according to the received operation is performed.

5. The robotic surgical system according to claim 1, wherein the controller is configured or programmed to perform the arm interference avoidance control when a first attachment position of the first surgical instrument with respect to the first manipulator arm and a second attachment position of the second surgical instrument with respect to the second manipulator arm are located on opposite sides with respect to a plane including a straight line connecting a first pivot position set on the first surgical instrument and a second pivot position set on the second surgical instrument and a straight line in a direction in which the first surgical instrument extends.

6. The robotic surgical system according to claim 1, wherein the second surgical instrument includes a shaft;

the direction in which the second surgical instrument extends is in a direction in which the shaft extends;

the reference line includes a second reference line orthogonal to the direction in which the shaft extends, the second reference line passing through a rotation center of a rotation axis about which the second link of the second manipulator arm is rotated; and the controller is configured or programmed to perform the arm interference avoidance control such that the second reference line moves along the outer edge of the approach prohibited range.

7. The robotic surgical system according to claim 6, wherein the first manipulator arm includes a plurality of joint axes including a base end axis corresponding to an axis on a base end side of the first manipulator arm; and the controller is configured or programmed to perform operations further comprising:

presetting a reference point to radially move the first surgical instrument with respect to a pivot position that serves as a fulcrum for movement of the first surgical instrument on a straight line along the base end axis; and performing the arm interference avoidance control by moving the reference point such that the second reference line moves along the outer edge of the approach prohibited range when the second manipulator arm approaches within the approach prohibited range of the first manipulator arm.

8. The robotic surgical system according to claim 7, wherein the controller is configured or programmed to perform the arm interference avoidance control when a movement amount of the reference point moved by the arm interference avoidance control is larger than a movement amount of the reference point based on the received operation.

9. The robotic surgical system according to claim 1, wherein the controller is configured or programmed to perform a control to gradually move the second manipulator arm to a position based on the received operation when the first manipulator arm is moved such that a state in which the second manipulator arm approaches within the approach prohibited range of the first manipulator arm is canceled.

10. The robotic surgical system according to claim 1, wherein the patient-side apparatus includes an arm base to which the first and second manipulator arms are attached; and the first manipulator arm and the second manipulator arm are arranged adjacent to each other on the arm base.

11. The robotic surgical system according to claim 1, wherein at least one of the first manipulator arm or the second manipulator arm includes seven or more joint axes.

12. A patient-side apparatus comprising:

first and second manipulator arms having tip end sides to which first and second surgical instruments are attached, respectively; and a controller configured or programmed to perform a control to operate the first and second surgical instruments based on operations for the first and second surgical instruments received by an operation unit operable to receive the operations; wherein the first and second manipulator arms include first links to which the first and second surgical instruments are attached, respectively, and second links connected to the first links, respectively; and the controller is configured or programmed to perform operations comprising:

setting an approach prohibited range in which approach to the first surgical instrument attached to the first manipulator arm is prohibited;

setting a reference line orthogonal to a direction in which the second surgical instrument extends, the reference line passing through the second link of the second manipulator arm; and performing an arm interference avoidance control to move the second manipulator arm relative to the first manipulator arm such that the reference line moves along an outer edge of the approach prohibited range when the second manipulator arm approaches within the approach prohibited range of the first manipulator arm.

13. The patient-side apparatus according to claim 12, wherein the approach prohibited range is a space having a substantially cylindrical shape, an axis of which is along a direction in which the first surgical instrument extends, the space being set such that the second manipulator arm does not collide with the first manipulator arm; and the controller is configured or programmed to perform the arm interference avoidance control such that the reference line moves along a tangential direction of an outer peripheral surface of the approach prohibited range having the substantially cylindrical shape when the second surgical instrument approaches within the approach prohibited range of the first manipulator arm.

14. The patient-side apparatus according to claim 12, wherein the second surgical instrument includes a shaft;

the direction in which the second surgical instrument extends is in a direction in which the shaft extends;

the reference line includes a first reference line orthogonal to the direction in which the shaft extends, the first reference line being tangent to an end of the second link of the second manipulator arm on a tip end side of the shaft; and the controller is configured or programmed to perform the arm interference avoidance control such that the first reference line moves along the outer edge of the approach prohibited range.

15. The patient-side apparatus according to claim 14, wherein the controller is configured or programmed to perform the arm interference avoidance control when a rotation amount of the second manipulator arm when the arm interference avoidance control is performed is larger than a rotation amount of the second manipulator arm when a control to move the second manipulator arm according to the received operation is performed.

16. The patient-side apparatus according to claim 12, wherein the controller is configured or programmed to perform the arm interference avoidance control when a first attachment position of the first surgical instrument with respect to the first manipulator arm and a second attachment position of the second surgical instrument with respect to the second manipulator arm are located on opposite sides with respect to a plane including a straight line connecting a first pivot position set on the first surgical instrument and a second pivot position set on the second surgical instrument and a straight line in a direction in which the first surgical instrument extends.

17. The patient-side apparatus according to claim 12, wherein the second surgical instrument includes a shaft;

the direction in which the second surgical instrument extends is in a direction in which the shaft extends;

the reference line includes a second reference line orthogonal to the direction in which the shaft extends, the second reference line passing through a rotation center of a rotation axis about which the second link of the second manipulator arm is rotated; and the controller is configured or programmed to perform the arm interference avoidance control such that the second reference line moves along the outer edge of the approach prohibited range.

18. The patient-side apparatus according to claim 17, wherein the first manipulator arm includes a plurality of joint axes including a base end axis corresponding to an axis on a base end side of the first manipulator arm; and the controller is configured or programmed to perform operations further comprising:

presetting a reference point to radially move the first surgical instrument with respect to a pivot position that serves as a fulcrum for movement of the first surgical instrument on a straight line along the base end axis; and performing the arm interference avoidance control by moving the reference point such that the second reference line moves along the outer edge of the approach prohibited range when the second manipulator arm approaches within the approach prohibited range of the first manipulator arm.

19. The patient-side apparatus according to claim 18, wherein the controller is configured or programmed to perform the arm interference avoidance control when a movement amount of the reference point moved by the arm interference avoidance control is larger than a movement amount of the reference point based on the received operation.

20. A control method for a robotic surgical system, the control method comprising:

receiving operations for first and second surgical instruments attached to tip end sides of first and second manipulator arms, respectively; and performing a control to operate the first and second surgical instruments based on the received operations; wherein the performing the control to operate the first and second surgical instruments includes:

setting an approach prohibited range in which approach to the first surgical instrument is prohibited;

setting a reference line orthogonal to a direction in which the second surgical instrument extends, the reference line passing through a second link connected to a first link of the second manipulator arm to which the second surgical instrument is attached; and performing an arm interference avoidance control to move the second manipulator arm relative to the first manipulator arm such that the reference line moves along an outer edge of the approach prohibited range when the second manipulator arm approaches within the approach prohibited range of the first manipulator arm.

* * * * *